(12) United States Patent
Gendler et al.

(10) Patent No.: US 12,124,314 B2
(45) Date of Patent: Oct. 22, 2024

(54) APPARATUS AND METHOD TO DETECT POWER SUPPLY SECURITY ATTACK AND RISK MITIGATION

(71) Applicant: Intel Corporation, Santa Clara, CA (US)

(72) Inventors: Alexander Gendler, Kiriat Motzkin (IL); Adwait Purandare, Hillsboro, OR (US); Ankush Varma, Portland, OR (US); Nazar Haider, Fremont, CA (US); Daniela Kaufman, Kefar Saba (IL); Gilad Bomstein, Petach Tikva (IL); Shlomo Attias, Haifa (IL); Amit Gabai, Kiriyat Biyalik (IL); Ariel Szapiro, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 706 days.

(21) Appl. No.: 17/207,299

(22) Filed: Mar. 19, 2021

(65) Prior Publication Data

US 2021/0208659 A1 Jul. 8, 2021

(51) Int. Cl.
| | |
|---|---|
| *G06F 1/324* | (2019.01) |
| *G06F 1/28* | (2006.01) |
| *G06F 21/55* | (2013.01) |
| *G06F 21/56* | (2013.01) |
| *G06F 21/71* | (2013.01) |
| *G06F 21/81* | (2013.01) |

(52) U.S. Cl.
CPC .............. *G06F 1/324* (2013.01); *G06F 1/28* (2013.01); *G06F 21/554* (2013.01); *G06F 21/566* (2013.01); *G06F 21/71* (2013.01); *G06F 21/81* (2013.01); *G06F 2221/034* (2013.01)

(58) Field of Classification Search
CPC .......... G06F 1/324; G06F 1/28; G06F 21/554; G06F 21/71; G06F 21/81; G06F 21/566
See application file for complete search history.

(56) References Cited

U.S. PATENT DOCUMENTS

| | | | | |
|---|---|---|---|---|
| 2013/0275782 | A1* | 10/2013 | Svilan | G06F 1/3287 713/300 |
| 2015/0091915 | A1* | 4/2015 | Hurd | G06F 9/38 345/506 |
| 2015/0268997 | A1* | 9/2015 | Svilan | G06F 1/329 718/102 |
| 2019/0369696 | A1* | 12/2019 | Heilper | G06F 1/3206 |

\* cited by examiner

*Primary Examiner* — Glenn A. Auve
(74) *Attorney, Agent, or Firm* — Nicholson De Vos Webster & Elliott LLP

(57) ABSTRACT

An adaptive or dynamic power virus control scheme (hardware and/or software) that dynamically adjusts maximum dynamic capacitance (CdynMax) and corresponding maximum frequency (P0nMax) setting per application executed on a processor core. A power management unit monitors telemetry such as a number of throttled cycles due to CdynMax threshold excursions cycles for the processor core and a cost of average cycle Cdyn cost for the processor core. As the number of throttling cycles increases for the processor core, the aCode firmware of the power management unit decides to increase the Cdyn level or threshold for that core (e.g., to make the threshold less aggressive). As the average Cdyn cost over a number of cycles becomes lower than a threshold, aCode adjusts the threshold to a lower threshold (e.g., more aggressive threshold) and lower Cdyn.

20 Claims, 7 Drawing Sheets

APPARATUS AND METHOD TO DETECT POWER SUPPLY SECURITY ATTACK AND RISK MITIGATION

BACKGROUND

As power requirements for computing systems have grown, power management for energy conservation remains a challenge. Currently, a computing system has a fixed dynamic capacitance threshold which is usually the maximum dynamic capacitance (CdynMax) to allow enough power delivery to handle any workload execution at the fastest speed (and thus higher power). CdynMax directly impacts multiple parameters in a computer system. CdynMax is a parameter which is used to define processor power delivery system and provides the guard band in designing various circuits and performance metrics. For example, CdynMax may dictate the power supply regulation specifications (e.g., output voltage level and current), power gate sizing, voltage regulator maximum current, voltage regulator maximum current, quality and reliability guard bands, IR drop, di/dt droop, and maximum operating frequency P0nMax.

Each License Class has a different CdynMax. Generally, SSE CdynMax<AVX2 CdynMax<AVX3 CdynMax<TMUL CdynMax. Different P0nMax is assigned per license. For each license, today P0nMax is defined based on its CdynMax such that IccMax (CdynMax*P0nMax*V+leakage) <SoC IccMax. This equation is used to search P0nMax. Hence, SSE P0nMax>AVX2 P0nMax>AVX3 P0nMax>TMUL P0nMax. So, each license class gets clipped to its respective P0nMax. Here SSE refers to streaming single instruction multiple data (SIMD) instruction set extension to the x86 architecture by Intel Corporation, AVX2 refers to Advanced Vector Extensions 2 instruction which is an extension of the AVX instruction set, AVX3 refers to Advanced Vector Extensions 3 instruction which is an extension of the AVX instruction set, and TMUL is an instruction related to a tile matrix multiply unit.

As discussed herein, these instructions may not have the same CdynMax. As such, the maximum current limit IccMax (which is defined as CVF, where C is the worst case CdynMax and F=highest frequency P0nMax, and V is the highest supply voltage level) for the computing system limits the power management of the computing system for various instructions executed on the computing system. Currently, IccMax is set according to a worst-case transient scenario. The worst-case transient scenario occurs when applications go from {low Cdyn, P0nMax frequency} to {Maximum Cdyn, P0nMax frequency} and stay there until maximum allowed power (PMAX) or Running Average Limit (RAPL) (e.g., power limits PL2 or PL1) bring the operating frequency down. Conversely, in steady state, high Cdyn workloads always run at power level P1 (or Thermal Design Power (TDP) frequency). But the IccMax is always specified based on the above transient.

Legacy power virus threshold (per license) is set statically based on the worst-case Cdyn threshold that does not throttle any workload in that license. IccMax increases from processor generation to generation. An average application executing on a processor continues to consume the same resources, but due to wider and deeper machines, the worst case CdynMax continues to increase. The growing CdynMax impacts power delivery for a processor (e.g., system-on-chip) and also impacts performance as P0nMax search today is done at CdynMax to check the IccMax limit for the processor.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
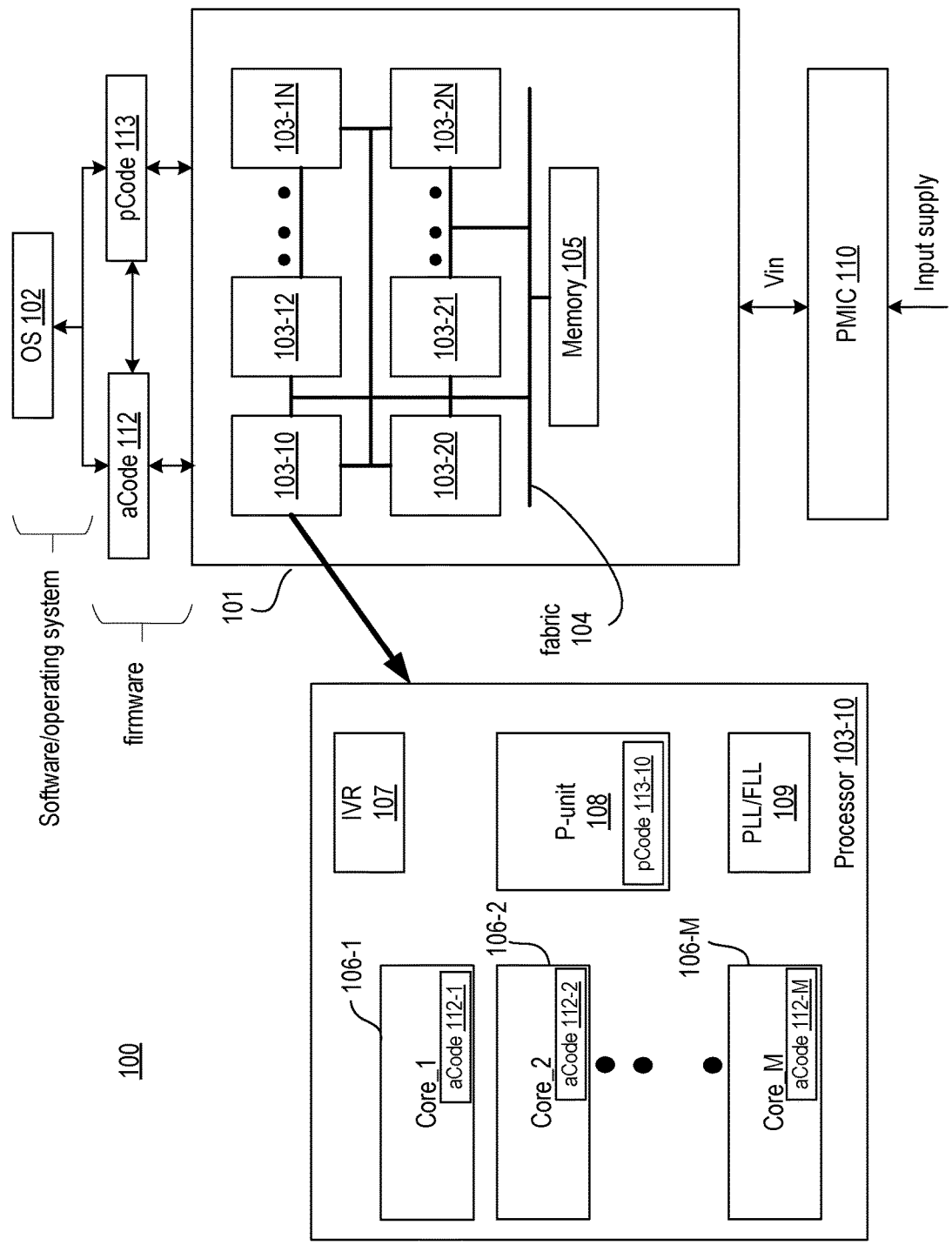
FIG. 1 illustrates a processor with power virus control (PVC) scheme to manage power of the processor, in accordance with some embodiments.

Some embodiments describe an adaptive or dynamic power virus control (PVC) scheme (hardware and/or software) that dynamically or adaptively adjusts CdynMax and corresponding maximum frequency (P0nMax or TRL) setting per application executed on a processor core. Part of the scheme is implemented in a power control unit (p-unit) and part of it is implemented as firmware (FW) associated or executed on the power control unit, in accordance with some embodiments. As discussed herein, a p-unit executes a firmware called pCode. Some embodiments use a lower level abstraction of pCode, called aCode, which executes on a p-unit at a processor core level instead of a higher-level abstraction of a processor (having the processor cores) or a system-on-chip (SoC) having homogenous or heterogeneous intellectual property blocks or dies. However, the embodiments can be performed by the pCode since the aCode communicates with the pCode. Here, P0nMax refers to the maximum Turbo frequency for all cores, P1 refers to the Thermal Design Power TDP frequency, and P0 is same as P0nMax. Managing dynamic PVC at the processor granularity (e.g., closer to the processor) enables faster threshold transitions (e.g., few microseconds) and firmware (FW) loop convergence. This enables following workload phases more closely. Here managing dynamic PVC at the processor granularity generally means the faster time it takes to decide the license and working-point (WPs) because the PVC scheme operates more closely to the processor core execution time scale.

Here adjusting CdynMax refers to adjusting CdynMax threshold (also referred to as PVC threshold) in a closed loop scheme. A power management unit monitors telemetry such as a number of throttled cycles for a processor core and a cost of average cycle Cdyn cost for a processor core (e.g., moving average Cdyn cost over a number of cycles (e.g., 64, 100, 2000, etc. cycles for a processor core). As the number of throttling cycles increases for the processor core, the aCode of the power management unit decides to increase the CdynMax level or threshold for that core (e.g., to make the threshold less aggressive). For example, if the number of throttled cycles is too high as to indicate a workload with high Cdyn (which may be a power virus), the PVC scheme increases the CdynMax level or threshold. More throttled cycles indicate an application with high Cdyn. As throttling cycles increases (e.g., above a threshold), operating frequency is lowered by the PVC scheme to lower the number of throttling cycles. As the average Cdyn cost over a number of fixed or programmable cycles becomes lower than a threshold, aCode adjusts the PVC threshold to a lower threshold (e.g., more aggressive threshold) and lower Cdyn.

Here, more aggressive threshold refers to lowering the CdynMax threshold, while lesser aggressive or conservative threshold refers to higher CdynMax threshold. A lower Cdyn cost indicates an application with low Cdyn which leads to lowering the CdynMax threshold and increase in operating frequency.

In some embodiments, P0nMax frequencies (or TRL) are mapped to PVC thresholds. Higher P0nMax frequencies (e.g., SSE P0n) are mapped to aggressive PVC threshold (e.g., lower CdynMax) and lower P0nMax frequencies are mapped to conservative thresholds (e.g., higher CdynMax). When aCode dynamically switches the PVC thresholds, the p-unit changes the frequency limit of the clock of the processor core accordingly. For example, the p-unit will instruct a phase locked loop (PLL) or a frequency locked loop (FLL) to adjust the frequency. Each PVC threshold (or CdynMax threshold) is mapped to a unique operating frequency. For example, higher (or highest) PVC threshold are mapped to lower (or lowest) operating frequencies, and lower (or lowest) PVC thresholds are mapped to higher (or highest) operating frequencies.

There are many technical effects of the various embodiments. For example, the PVC scheme of various embodiments enables dynamic adjustment of CdynMax and corresponding maximum frequency limit (TRL or P0nMax) per application being executed on a processor core. The scheme prevents high Cdyn workloads or applications that run at much lower frequency (e.g., P1 frequency level) in steady state to ever hit P0nMax frequencies even during transients. This prevention directly lowers the IccMax of the SoC. An example of a high Cdyn application is the Persistence of Vision Ray Tracer, most commonly known as POV-Ray. The PVC scheme is agnostic to an instruction type. The scheme of various embodiments improves performance (e.g., power consumption and battery life) and hides customer visible performance glass jaws. For example, low Cdyn workloads that are higher class (e.g., sparse AVX3 instruction) may not be limited anymore by the AVX3 P0nMax frequency. Here, higher class refers to higher license. A license is a processor core definition of what type of instruction the processor core is allowed to execute and the associated CdynMax for it. For example, if the processor core is running AVX1 instructions, the license is set to license 1, the core will then throttle if there is an instruction not in that group and the core will use the license 1 CdynMax for its work-point calculation. Note, AVX3 P0nMax is defined based on AVX3 CdynMax. Such low Cdyn workloads can run at AVX2 or SSE P0n frequency due to the dynamic adjustment in the CdynMax threshold by the PVC scheme. In one example, the PVC scheme lowers the average CdynMax about 30% lower than the CdynMax in today's processor. Other technical effects will be evident from the various embodiments and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

FIG. 1 illustrates a processor with hardware based unsupervised based machine-learning (ML) approach to identify and mitigate a security threat to the processor, in accordance with some embodiments. Processor system 100 comprises processor 101 coupled to operating system (OS) 102. Processor 101 comprises one or more processors 103 (individually labeled as processors 103_10 through 103_1N, and 103_20 through 103_2N, where 'N' is a number), fabric 104 connecting the processor 103, and memory 105. In some embodiments, each processor 103 is a die, dielet, or chiplet. Here the term "die" generally refers to a single continuous piece of semiconductor material (e.g. silicon) where transistors or other components making up a processor core may reside. Multi-core processors may have two or more processors on a single die, but alternatively, the two or more processors may be provided on two or more respective dies. Each die has a dedicated power controller or power control unit (p-unit) power controller or power control unit (p-unit) which can be dynamically or statically configured as a supervisor or supervisee. In some examples, dies are of the same size and functionality i.e., symmetric cores. However, dies can also be asymmetric. For example, some dies have different size and/or function than other dies. Each processor 103 may also be a dielet or chiplet. Here the term "dielet" or "chiplet" generally refers to a physically distinct semiconductor die, typically connected to an adjacent die in a way that allows the fabric across a die boundary to function like a single fabric rather than as two distinct fabrics. Thus at least some dies may be dielets. Each dielet may include one or more p-units which can be dynamically or statically configured as a supervisor, supervisee or both.

In some embodiments, fabric 104 is a collection of interconnects or a single interconnect that allows the various dies to communicate with one another. Here the term "fabric" generally refers to communication mechanism having a known set of sources, destinations, routing rules, topology and other properties. The sources and destinations may be any type of data handling functional unit such as power management units. Fabrics can be two-dimensional spanning along an x-y plane of a die and/or three-dimensional (3D) spanning along an x-y-z plane of a stack of vertical and horizontally positioned dies. A single fabric may span multiple dies. A fabric can take any topology such as mesh topology, star topology, daisy chain topology. A fabric may be part of a network-on-chip (NoC) with multiple agents. These agents can be any functional unit.

In some embodiments, each of the one or more processor 103 may include a number of processor cores. One such example is illustrated with reference to processor 103_10. In this example, processor 103_10 includes a plurality of processor cores 106-1 through 106-M, where M is a number. For the sake of simplicity, a processor core is referred by the general label 106. Here, the term "processor core" generally refers to an independent execution unit that can run one program thread at a time in parallel with other cores. A processor core may include a dedicated power controller or power control unit (p-unit) which can be dynamically or statically configured as a supervisor or supervisee. This dedicated p-unit is also referred to as an autonomous p-unit, in some examples. In some examples, all processor cores are of the same size and functionality i.e., symmetric cores. However, processor cores can also be asymmetric. For example, some processor cores have different size and/or function than other processor cores. A processor core can be a virtual processor core or a physical processor core. Processor 103_10 may include an integrated voltage regulator (IVR) 107, power control unit (p-unit) 108, phase locked loop (PLL) and/or frequency locked loop (FLL) 109. The various blocks of processor 103_10 may be coupled via an interface or fabric. Here, the term "interconnect" refers to a communication link, or channel, between two or more points or nodes. It may comprise one or more separate conduction paths such as wires, vias, waveguides, passive components, and/or active components. It may also comprise a fabric. In some embodiments, p-unit 108 is coupled to OS 102 via an interface. Here the term "interface" generally refers to software and/or hardware used to communicate with an interconnect. An interface may include logic and I/O driver/receiver to send and receive data over the interconnect or one or more wires.

In some embodiments, each processor 103 is coupled to a power supply via voltage regulator. The voltage regulator may be internal to processor system 101 (e.g., on the package of processor system 101) or external to processor system 101. In some embodiments, each processor 103 includes IVR 107 that receives a primary regulated voltage from the voltage regulator of processor system 101 and generates an operating voltage for the agents of processor 103. The agents of processor 103 are the various components of processor 103 including cores 106, IVR 107, p-unit 108, and PLL/FLL 109.

Accordingly, an implementation of IVR 107 may allow for fine-grained control of voltage and thus power and performance of each individual core 106. As such, each core 106 can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. For example, each core 106 may include an IVR to manage power supply to that core where that IVR receives input power supply from the regulated output of IVR 107 or voltage regulator of processor system 101. During power management, a given power domain of one IVR may be powered down or off when the processor core 106 is placed into a certain low power state, while another power domain of another IVR remains active, or fully powered. As such, an IVR may control a certain domain of a logic or processor core 106. Here the term "domain" generally refers to a logical or physical perimeter that has similar properties (e.g., supply voltage, operating frequency, type of circuits or logic, and/or workload type) and/or is controlled by a particular agent. For example, a domain may be a group of logic units or function units that are controlled by a particular supervisor. A domain may also be referred to as an Autonomous Perimeter (AP). A domain can be an entire system-on-chip (SoC) or part of the SoC, and is governed by a p-unit.

In some embodiments, each processor 103 includes its own p-unit 108. P-unit 108 controls the power and/or performance of processor 103. P-unit 108 may control power and/or performance (e.g., IPC, frequency) of each individual core 106. In various embodiments, p-unit 108 of each processor 103 is coupled via fabric 104. As such, the p-units 108 of each processor 103 communicate with another and OS 102 to determine the optimal power state of processor system 101 by controlling power states of individual cores 106 under their domain.

P-unit 108 may include circuitry including hardware, software and/or firmware to perform power management operations with regard to processor 103. In some embodiments, p-unit 108 provides control information to voltage regulator of processor system 101 via an interface to cause the voltage regulator to generate the appropriate regulated voltage. In some embodiments, p-unit 108 provides control information to IVRs of cores 106 via another interface to control the operating voltage generated (or to cause a corresponding IVR to be disabled in a low power mode). In some embodiments, p-unit 108 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software). In some embodiments, p-unit 108 is implemented as a microcontroller. The microcontroller can be an embedded microcontroller which is a dedicated controller or as a general-purpose controller. In some embodiments, p-unit 108 is implemented as a control logic configured to execute its own dedicated power management code, here referred to as pCode. In some embodiments, power management operations to be performed by p-unit 108 may be implemented externally to a processor 103, such as by way of a separate power management integrated circuit (PMIC) or other component external to processor system 101. In yet other embodiments, power management operations to be performed by p-unit 108 may be implemented within BIOS or other system software. In some embodiments, p-unit 108 of a processor 103 may assume a role of a supervisor or supervisee.

Here the term "supervisor" generally refers to a power controller, or power management, unit (a "p-unit"), which monitors and manages power and performance related parameters for one or more associated power domains, either alone or in cooperation with one or more other p-units. Power/performance related parameters may include but are not limited to domain power, platform power, voltage, voltage domain current, die current, load-line, temperature, device latency, utilization, clock frequency, processing efficiency, current/future workload information, and other parameters. It may determine new power or performance parameters (limits, average operational, etc.) for the one or more domains. These parameters may then be communicated to supervisee p-units, or directly to controlled or monitored entities such as VR or clock throttle control registers, via one or more fabrics and/or interconnects. A supervisor learns of the workload (present and future) of one or more dies, power measurements of the one or more dies, and other parameters (e.g., platform level power boundaries) and determines new power limits for the one or more dies.

These power limits are then communicated by supervisor p-units to the supervisee p-units via one or more fabrics and/or interconnect. In examples where a die has one p-unit, a supervisor (Svor) p-unit is also referred to as supervisor die.

Here the term "supervisee" generally refers to a power controller, or power management, unit (a "p-unit"), which monitors and manages power and performance related parameters for one or more associated power domains, either alone or in cooperation with one or more other p-units and receives instructions from a supervisor to set power and/or performance parameters (e.g., supply voltage, operating frequency, maximum current, throttling threshold, etc.) for its associated power domain. In examples where a die has one p-unit, a supervisee (Svee) p-unit may also be referred to as a supervisee die. Note that a p-unit may serve either as a Svor, a Svee, or both a Svor/Svee p-unit.

In various embodiments, p-unit 108 executes a firmware (referred to as pCode and/or aCode) that communicates with OS 102. In various embodiments, each processor 103 includes a PLL or FLL 109 that generates clock from p-unit 108 and input clock (or reference clock) for each core 106. Cores 106 may include or be associated with independent clock generation circuitry such as one or more PLLs to control operating frequency of each core 106 independently. In some embodiments, an input supply is received by PMIC (power management integrated circuit) 110 which provides a regulated supply Vin to processor system 101. In some embodiments, Vin is used as input supply by local voltage regulator(s) to generate local supplies for one or more domains.

Figure 2:
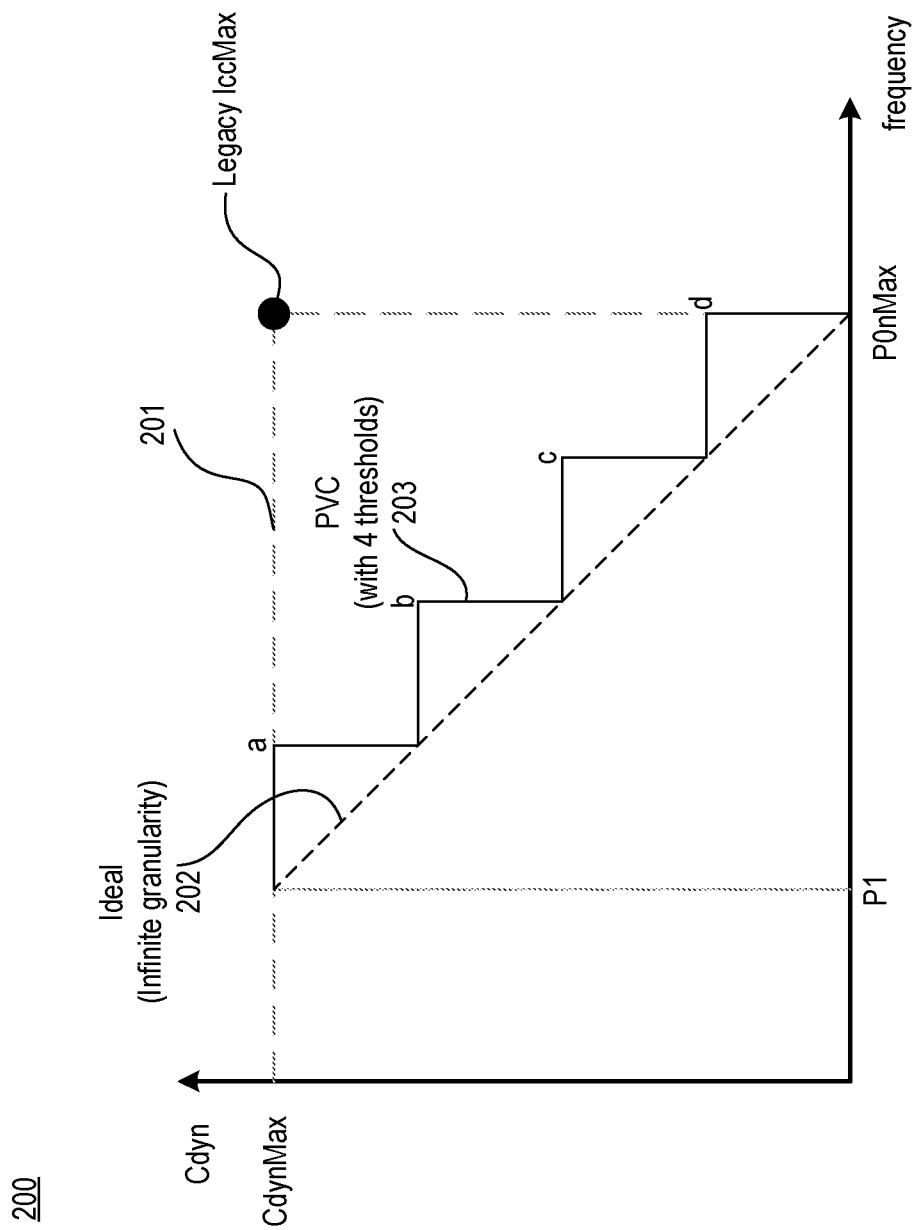
FIG. 2 illustrates a plot showing IccMax for a current processor, and the benefit of a multi-threshold PVC scheme, in accordance with some embodiments.

In some embodiments, each processor core 106 includes a p-unit that executes aCode, a firmware to manage core-level performance. In this example, core_1 106-1 includes p-unit 112-1 that executes its aCode, core_2 106-2 includes p-unit 112-2 that executes its aCode, . . . and core_M 106-M includes p-unit 112-M that executes its aCode. In some embodiments, pCode 113-10 of p-unit 108. The aCode associated with each processor core can communicate with a local p-unit or a supervisor p-unit. The abstraction level of aCode 112 and pCode 113 is illustrated in FIG. 2 as firmware communicating with one another and OS 102.

In some embodiments, p-unit 108 and/or local p-units that execute aCode 112 implement an adaptive or dynamic power virus control (PVC) scheme (hardware and/or software) that dynamically adjusts CdynMax and corresponding maximum frequency (P0nMax or TRL) setting per application per core. In some embodiments, part of the scheme is implemented in a power control unit (p-unit) and part of it is implemented as firmware associated or executed on the power control unit. As discussed herein, p-unit executes a firmware called pCode. Here adjusting CdynMax refers to adjusting the CdynMax threshold (also referred to as PVC threshold) in a closed loop scheme. In some embodiments, p-unit 108 monitors telemetry such as a number of throttled cycles for a processor core and a cost of average cycle Cdyn cost (e.g., moving average Cdyn cost over a number of cycles (e.g., 64, 100, 2000, etc. cycles) for a processor core. As the number of throttling cycles increases for the processor core, aCode 112 of the power management unit decides to increase Cdyn level or threshold for that core (e.g., to make the threshold less aggressive). For example, if the number of throttled cycles is too high as to indicate a power virus, aCode of p-unit 112-1 of core 106-1 increases the CdynMax level or threshold for core_1 106-1. As the average Cdyn cost over a number fixed or programmable cycles is lower than a threshold, aCode 112 adjusts the threshold to a lower threshold (e.g., more aggressive threshold) and lower CdynMax.

In some embodiments, P0nMax frequencies (or TRL) are mapped to PVC thresholds. Higher P0nMax frequencies (e.g., SSE P0n) are mapped to aggressive PVC threshold (e.g., low CdynMax) and lower P0nMax frequencies are mapped to conservative thresholds (e.g., higher CdynMax). When aCode 112 dynamically switches the PVC thresholds, p-unit local to a processor core changes the frequency limit of the clock of the processor core accordingly. For example, p-unit 112-1 local to core_1 106-1 will instruct a phase locked loop (PLL) or a frequency locked loop (FLL) to adjust the frequency for core_1.

In various embodiments, aCode 112 at core level builds the following table:

TABLE 1

| Name of PVC threshold | Threshold Level | CdynMax | P0nMax Frequency for an instruction set |
|---|---|---|---|
| INT_Aggressive | Threshold0 | Cdyn Value0 | INT P0n |
| INT_Moderate | Threshold1 | Cdyn Value1 | INT P0n |
| INT_Conservative | Threshold2 | Cdyn Value2 | SSE P0n |
| 128_Aggresive | Threshold3 | Cdyn Value3 | SSE P0n |
| 128_Moderate | Threshold4 | Cdyn Value4 | SSE P0n |
| 128_Conservative | Threshold5 | Cdyn Value5 | AVX2 P0n |
| 256_Aggressive | Threshold6 | Cdyn Value6 | SSE P0n |
| 256_Moderate | Threshold7 | Cdyn Value7 | AVX2 P0n |
| 256_Conservative | Threshold8 | Cdyn Value8 | AVX3 P0n |
| 512_Aggressive | Threshold9 | Cdyn Value9 | AVX2 P0n |
| 512_Moderate | Threshold10 | Cdyn Value10 | AVX3 P0n |
| 512_Conservative | Threshold11 | Cdyn Value11 | TMUL P0n |
| TMUL_Aggressive | Threshold12 | Cdyn Value12 | AVX2 P0n |
| TMUL_Moderate | Threshold13 | Cdyn Value13 | AVX3 P0n |
| TMUL_Conservative | Threshold14 | Cdyn Value14 | TMUL P0n |

The example in Table 1 assumes three levels per license. For higher licenses (wider dunamic range of cdyn) more than three threshold levels can be used. For instance, when five PVC thresholds are used for TMUL instruction set, an entire range of INT P0n to TMUL P0n can be mapped to different levels.

FIG. 2 illustrates plot 200 showing IccMax for a current processor, and the benefit of a multi-threshold PVC scheme, in accordance with some embodiments. The x-axis is frequency, and the y-axis is CdynMax (dynamic capacitance). Dashed line 201 shows the transient that defines SoC IccMax in current SoC platforms (e.g., CdynMax at P0nMax). Dashed line 202 shows the ideal Cdyn-Frequency curve (e.g., a curve with infinite granularity). Solid line 203 shows the benefit with a 4-threshold PVC, where a, b, c, and d are the four thresholds. With PVC, SoC IccMax is adjusted to any one of the thresholds (e.g., Icc at a, Icc at b, Icc at c, Icc at d) which is clearly less than Legacy IccMax. Solid line 203 tends to the ideal dashed line 202 as the number of PVC thresholds is increased.

PVC has an adaptive control mechanism that dynamically adjusts CdynMax and corresponding maximum frequency (P0nMax or TRL) setting per application. This provides a path to lower the SoC IccMax without impacting any steady state performance. As high Cdyn workloads never run at P0nMax in steady state, and low Cdyn workloads run at P0nMax, PVC can dynamically adjust CdynMax and maximum frequency thresholds such that a high Cdyn workload will not hit P0nMax even in the transient case. This lowers the SoC IccMax. And corollary to this is that a low Cdyn workload (e.g., sparse AVX3 instruction) that falls in higher class is able to run at SSE or AVX2 P0nMax frequencies due to the dynamic adjustment in the PVC threshold or CdynMax threshold.

Here, transient case refers to change in Cdyn and frequency during execution of the application. The worst-case transient scenario occurs when applications go from {low Cdyn, P0nMax frequency} to {Maximum Cdyn, P0nMax frequency} and stay there until maximum allowed power (PMAX) or Running Average Limit (RAPL) (e.g., power limits PL2 or PL1) bring the operating frequency down. Conversely, in steady state, high Cdyn workloads always run at P1 (or Thermal Design Power (TDP) frequency). Typically, the IccMax is always specified based on the above transient. The transient is shown in this figure FIG. 2 by dashed line 201.

The PVC dynamic adjustment of CdynMax threshold and the maximum operating frequency setting is based on transient throttling of applications inside an intellectual property (IP) block and the needs of the SoC at the time. For example, there can be scenarios where it is ok for a user to have higher percentage of transient throttling at the benefit of better frequency during steady state. In another case, there can be another user that does not tolerate any transient throttling. The CdynMax threshold configuration can be different for these two scenarios based on the user needs. In various embodiments, the PVC does not throttle steady state performance of a workload. Here, steady state occurs when a workload is running at steady or homogenous phase. The Cdyn in the steady state case is pretty much constant without any fluctuations over time. Conversely, transient state occurs when either the workload itself is changing or the same workload is changing phases. This is a scenario where Cdyn changes before a steady state portion is reached. Changing Cdyn during execution of the workload refers to a transient state, and during this transient state PCV adjusts PVC thresholds to match a new steady state. During PVC threshold adjustments, there can be intermittent throttling, in accordance with some embodiments.

Figure 3:
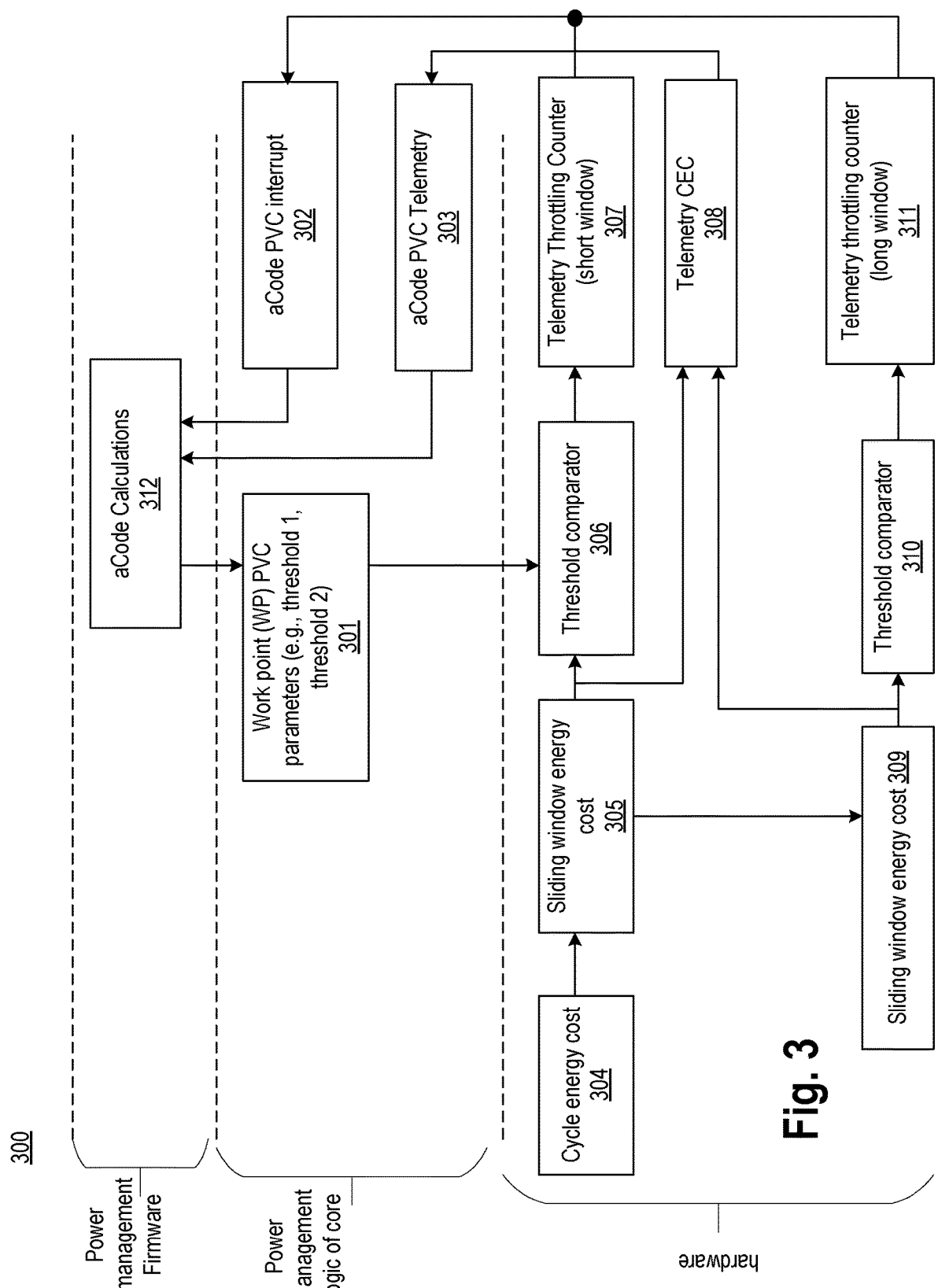
FIG. 3 illustrates a high-level hardware-firmware framework for PVC scheme, in accordance with some embodiments.

FIG. 3 illustrates a high-level hardware-firmware framework 300 for the PVC scheme, in accordance with some embodiments. Framework 300 is divided into functions performed by processor core hardware, functions performed by power management unit of a core, and functions performed by power management firmware (e.g., aCode and/or pCode).

In some embodiments, the power management logic of the processor core (e.g., 112-1) gets work point (WP) PVC parameters (e.g., CdynMax thresholds) from aCode calculations as indicated by block 301. Block 302 gets both the number of throttled cycles telemetry from the nucleus core (e.g., two indications, short (e.g., 64) and long (e.g., 1024) average throttling cycles), and also the active residency (e.g., C0 residency, where C0 is defined by Advanced Configuration and Power Interface (ACPI) specification)) every defined time period (e.g., 6.4 µS). In some embodiments, the firmware of aCode decides which of the throttling (e.g., one of the short window (e.g., 64) or long window (e.g., 1024)) will cause the interrupt. In some embodiments, to make CdynMax threshold less aggressive, at block 312, aCode calculates a ratio between the throttling cycles to C0 residency. This ratio may be fetched from a lookup table in hardware that includes ratios for various throttling cycles to C0 residency. At block 312, aCode then compares if the throttling percentage preceded a configurable threshold and if it does, aCode gets the interrupt to make the threshold less aggressive. In some embodiments, during aCode new workpoint (WP) threshold calculations at block 312, the hardware in block 302 is held on reset so no redundant interrupts will trigger bogus change of aCode threshold level. The aCode of the power management logic monitors the PVC telemetry at block 303. The telemetry includes a number of throttled cycles for the processor core and a cost of average cycle dynamic capacitance for the processor core.

Cycle energy cost 304 determines the power cost for an instruction executed on a processor core. In some embodiments, there is a unique weight (number) associated with each instruction type and each width (e.g., 64*b*, 128*b*, 256*b*, 512*b*) of the instruction type. As instructions is decoded, the associated weight for that instruction and width is accumulated in a counter. The count value of this counter is averaged over a particular window size (e.g., configurable 64, 256, 1024 cycles) to give an average energy cost.

Sliding window energy cost 305 is a counter which sums the amount of Cdyn that the core has generated during the shorter window. When the core is allocating a microoperation (UOP), it has a weight (parameter that defines the Cdyn) per UOP type and size. This counter adds the weight. Sliding window here means looking at the instruction pattern that the core is executing with a fixed window. For example, for 10K instructions a 64-cycle window size in that pattern is looked at. Sliding window energy cost 309 is a counter like the counter for Sliding window energy cost 305 but for a longer window.

In some embodiments, threshold comparator 306 compares a number of throttling with a threshold, and provides an output to a counter 307 which counts the number of throttling events. The number of thresholds is also saved in registers or counters at block 308. Block 308 may include a counter that determines how many cycles out of the short window size are above the Cdyn limitation. This telemetry from block 308 is then used by aCode to decide whether to change the working-point. In some embodiments, block 308 sends the actual Cdyn that the core is running at, and this Cdyn is then used for aCode for dynamic PVC.

Threshold comparators 306 and 310 take the outputs of their respective counters of sliding window energy costs 305 and 309 and compare them with their respective thresholds. Threshold comparator 306 has a first threshold (for the short sliding window) while threshold comparator 310 has a second threshold (for the long sliding window). For each threshold comparator 306/310, if the respective sliding window outcome is higher than the threshold it means that the current energy cost is above the Cdyn limitation and some action needs to be taken to address the energy cost and/or performance of the processor core.

The roles of telemetry throttling counter (short window) 307 and telemetry throttling counter (long window) 311 are to have the ability to run the processor core with higher Cdyn limitation for short periods and to limit the Cdyn in long periods. As such, an application that has short bursts of execution may not be throttled but if that application is giving a long enough window, its execution will be throttled.

Based on telemetry inputs, at block 312 aCode calculates the average throttling $$\frac{PVP_{THROTTLED}}{C0_{cycles}}$$

and average power lost as EWMA( $$\frac{POWER_{METER}}{C0_{cycles}}$$

and compares both values to configurable thresholds. Based on whether both conditions are met, aCode decides if the threshold can be decreased on not. That information is passed on to block 301 (e.g., power management logic).

Figure 4:
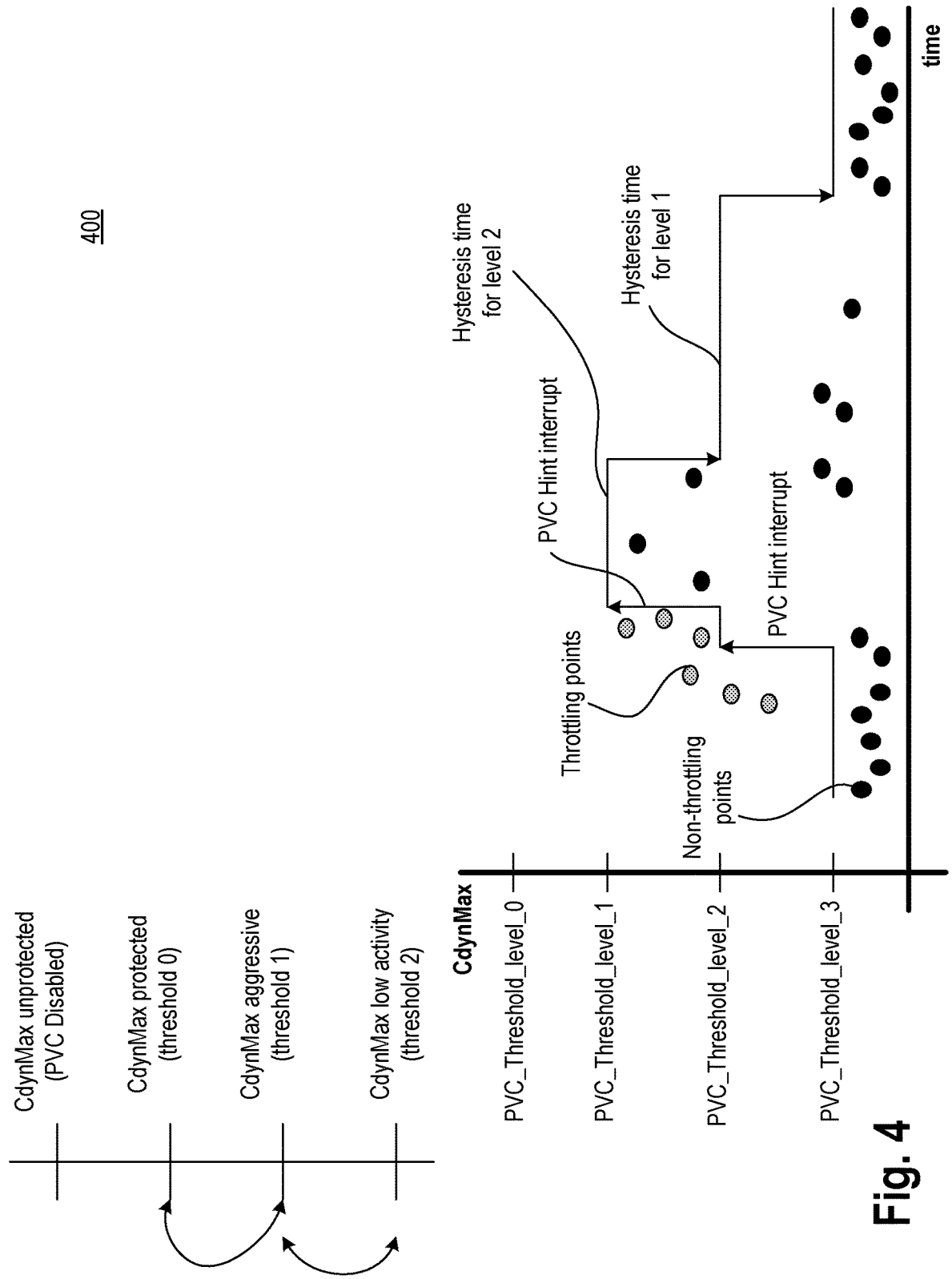
FIG. 4 illustrates a plot showing dynamic Cdyn threshold levels set by the PVC scheme, in accordance with some embodiments.

FIG. 4 illustrates plot 400 showing dynamic Cdyn threshold levels set by the PVC scheme, in accordance with some embodiments. Here, x-axis is time, and y-axis is PVC threshold levels or CdynMax levels. In plot 400, PVC_threshold_level_3 provides the lowest CdynMax while PVC_threshold_level_0 provides the highest CdynMax. When CdynMax is at the highest level, it is considered a protected environment where execution of the applications is not throttled. For example, the operating frequency and or supply voltage are the highest to provide fastest execution of the applications. In some embodiments, when CdynMax is the highest, the PVC scheme may still achieve CdynMax reduction compared to when the PVC scheme is disabled. For instance, the PVC scheme may achieve 20-25% reduction in CdynMax when the CdynMax threshold is zero.

Threshold 1 is associated with a CdynMax aggressive state. In this state, applications that consume high power are throttled while most applications that consume comparatively medium to low power are not affected by the PVC scheme. For a high-powered application, the PVC scheme is able to reduce Cdyn by, for example, 35-40% compared to when the PVC scheme is off. Threshold 2 is associated with a low Cdyn activity state while threshold 3 is associated with the lowest Cydyn activity state. In threshold 2, CdynMax is further reduced by 40-50%, for example, for most applications with load and store operations.

In some embodiments, aCode or any suitable logic determines the number of throttling events. If the number of throttling events is above a fixed or programmable limit, aCode suggests a change in the PVC threshold level. For example, as the threshold events increases, aCode suggests that CdynMax threshold increase to accommodate the execution of the application and to lower the threshold events. To that end, a PVC hint interrupt is issued for aCode to calculate a new CdynMax threshold or PVC threshold level. The CdynMax level for the processor core remains at the new level after the change for a fixed or programmable time. This time is the hysteresis time which is implemented to prevent aCode from shifting the CdynMax threshold intermittently. In some embodiments, for different CdynMax threshold, the hysteresis time is different. For example, as the CdynMax threshold is lowered (e.g., PVC_threshold_level_2), the hysteresis time increases. In this case, the hysteresis time for level PVC_threshold_level_2 is longer than hysteresis time for level PVC_threahold_level_1.

Figure 5:
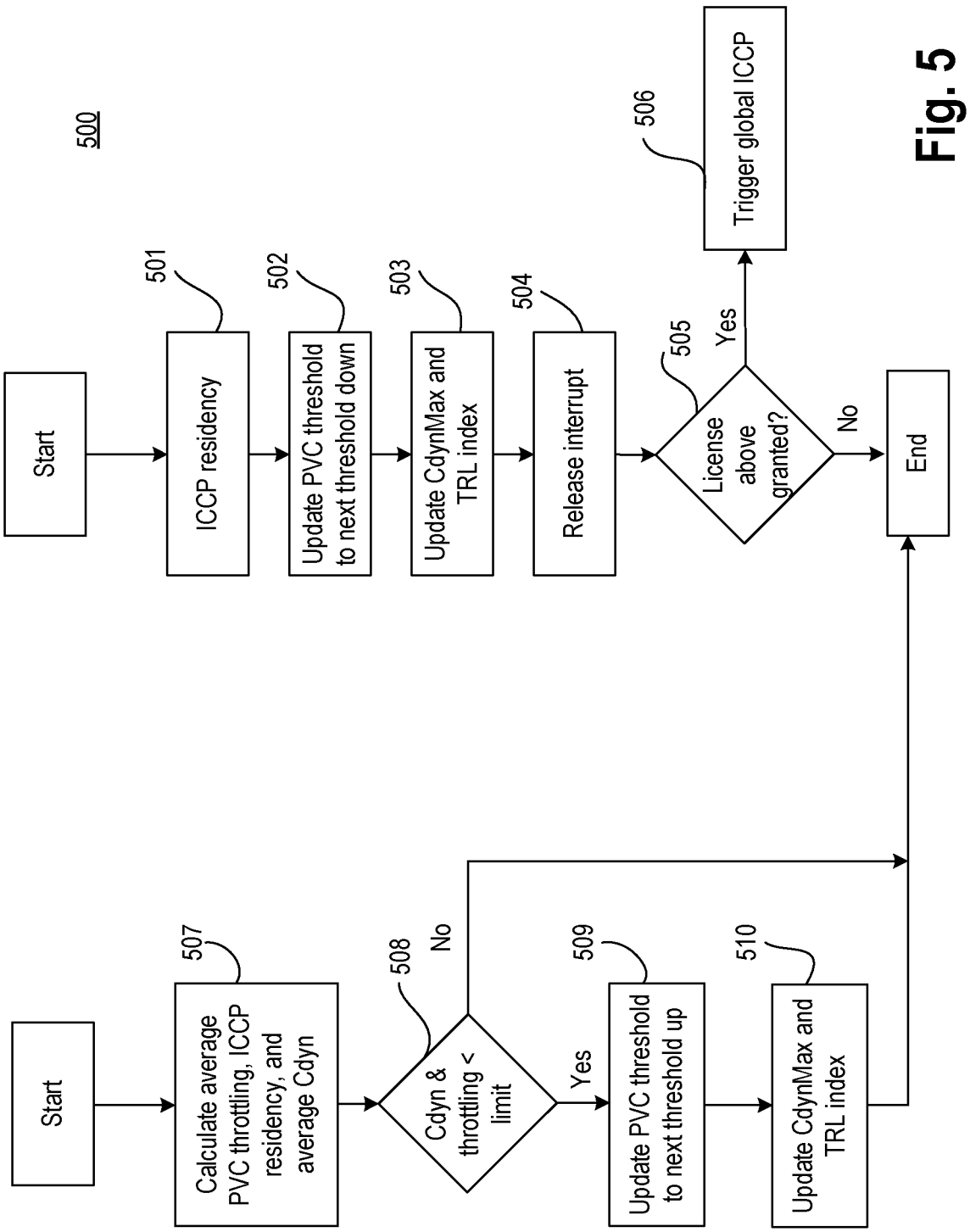
FIG. 5 illustrates a flowchart for the PVC scheme, in accordance with some embodiments.

FIG. 5 illustrates flowchart 500 for the PVC scheme, in accordance with some embodiments. While the blocks are shown in a particular order, the order can be modified. For example, some blocks may be performed in parallel, while some blocks can be performed before others. The various blocks can be performed by software, hardware, or a combination of them.

Flowchart 500 illustrates two paths to Cdyn adjustment. The first path comprises blocks 501 through 506, while the second path comprises blocks 507 through 510. In various embodiments, the second path is executed after the first path completes.

To enter or start the PVC scheme, the following condition for PVC entry license is met:

$$PVC_{Cdyn_{License}} = \text{If} \left( \left( PVC_{CdynMax} \leq License_{i_{CdynMax}} \right) \&\& (PVC_{CdynMax} > License_{i-1_{CdynMax}}) \right) License_i$$

Here, PV $CC_{CdynMax}$ refers to the capacitance defined for each PVC threshold. aCode transforms this Cdyn to indexes (licenses) based on pre-defined Cdyn values per index ($License_{i_{CdynMax}}$). This means if the $PVC_{cdynMax}$ is between the $License_{i_{cdynMax}}$ of license 2 (i=2) and $License_{i_{cdynMax}}$ of license 3 (i=3), aCode will report license 3.

At block 501, aCode determines IccP residency, were IccP refers to maximum current protection limit. The limit for IccP for each core is a license to operate that core at that current limit. So, an IccP license of a processor core allows the processor core to operate at the maximum current level specified in the IccP license.

Another way to look at IccP is that it refers to a license. aCode determines the license residency. IccP license residency provides an indication to aCode on the type of instructions that the core is running (e.g., SSE, AVX2, AVX3 or TMUL). Here residency simply means a number of core clock cycles spent in a given license. Each IccP license is mapped to a specific voltage and frequency curve (V/F curve) and CdynMax. Also, PVC thresholds (e.g., aggressive, moderate, conservative) are defined per license. So once aCode determines the IccP license through a license residency telemetry, aCode knows what PVP thresholds to apply.

In some embodiments, the IccP residency is specified by $R_{valid[iccp]}$, where $R_{valid[iccp]}$ is a 1/0 indication that specifics whether the IccP had residency in the period.

$$R_{valid[iccp]} = R_{[iccp]} > 0$$

For IccP to have residency in a period means whether a core ran at that particular IccP license during the evaluation period. For instance, if $R_{valid[avx2]}=1$, it means during that evaluation period, the core spent non-zero cycles in AVX2 license (meaning AVX2 license was used at least once). In another example, if $R_{valid[iccp]}$ is 1, then the IccP has a valid residency in a time period, and if $R_{valid[iccp]}$ is 0, then the IccP has an invalid residency in a time period. The flowchart here runs periodically. So, time period refers to the evaluation period. The time period can be interrupt based on any fixed timescale (e.g., 100 μS, 200 μS, 300 μS, etc.). An invalid residency means that a particular license was not used by the core in the last evaluation period.

At block 502, aCode updates the PVC threshold to next threshold down (e.g., threshold is set to −1 of the previous threshold (i.e., less aggressive state). As discussed herein, when the number of throttled cycles is too high (e.g., at a level where an application transitioned to a high Cdyn phase, which may also indicate a possible power virus), aCode will change the CdynMax threshold higher (i.e., less aggressive state) and lower the operating frequency.

The following calculation may be performed to determine whether threshold should be moved to lower threshold level.

First, throttling telemetry is calculated as:

$$Th_{avarage} = \frac{\text{Throttling\_cycles}}{\text{C0\_cycle}}$$

if (currentThreshold==threshold_unprotected$\|R_{valid\ [iccp]}$0)than no update requres else if $P_{threshold} < Th_{avarage}$ then update the threshold where, $P_{threshold}$ is the PVC threshold or CdynMax threshold and is a performance threshold for moving to a less aggressive threshold (default is 0.5%, for example), $Th_{average}$ is the average number of throttles in a period for the application executed on a core, or a percent of throttling over a period, aCode decides to switch the PVC threshold level to a less aggressive based on an interrupt from hardware that samples the residency and the throttling in the sampled period.

Upon changing the PVC threshold (or $P_{threshold}$), the CdynMax level is kept constant for a duration, which is referred to as the hysteresis time. If the processor core CdynMax threshold is on LowActivity+1 threshold, the hysteresis time period (e.g., 400 μSec) will be longer than previous hysteresis time period. If the CdynMax threshold is a protected threshold, then the hysteresis time period shorter (e.g., 200 μSec) than the previous hysteresis time period. For example, hysteresis time period values are between a linear extrapolation between those two points according to the previous and next threshold levels.

At block 503, aCode updates the CdynMax and frequency (TRL) index in line with the new CdynMax threshold or PVC threshold. When CdynMax threshold is lowered, operating frequency is increased. In some embodiments, when threshold is lowered (more aggressive), the frequency limit or P0nMax is increased. In some embodiments, when threshold is raised (less aggressive or conservative), the frequency limit or P0nMax is lowered.

Table 1 illustrates a frequency mapping to CdynMax threshold, for one example.

TABLE 2

| Frequency index | Cdyn ratio |
|---|---|
| TRL_INDEX_FOR_LIC_0 | 128b Mega-Transfer (MT) Low threshold Cdyn |
| TRL_INDEX_FOR_LIC_1 | 128b MT Aggressive threshold Cdyn |
| TRL_INDEX_FOR_LIC_2 | 256b MT Low threshold Cdyn |
| TRL_INDEX_FOR_LIC_3 | 256b MT Aggressive threshold Cdyn |
| TRL_INDEX_FOR_LIC_4 | 512b MT Low threshold Cdyn |
| TRL_INDEX_FOR_LIC_5 | 512b MT Aggressive threshold Cdyn |
| TRL_INDEX_FOR_LIC_6 | TMUL MT Low threshold Cdyn |
| TRL_INDEX_FOR_LIC_7 | TMUL MT Aggressive threshold Cdyn |

In some embodiments, the PVC scheme allows to separate Voltage/Frequency and Cdyn/frequency mapping. Note, IccP nature is a monotonic rising function that does not allow higher levels that have lower than previous level Cdyn. In one example, IccP licenses in the core are defined in Table 3:

TABLE 3

| license number | Name | Comment |
|---|---|---|
| 0 | 64/128 Light | This is SSE |
| 1 | 128 Heavy | |
| 2 | 256 Light | This is AVX2 |
| 3 | 256 Heavy | |
| 4 | 512 Light | This is AVX3 |
| 5 | 512 Heavy | |
| 6 | TMUL Light | This is TMUL |
| 7 | TMUL Heavy | |

These licenses are monotonically increasing in terms of their CdynMax (e.g., CdynMax for 0<=1<=2<=3<=4 . . . ). In some embodiments, with the PVC scheme, the processor core communicates with Heavy (H) licenses. Light and Heavy is simply based on the percentage utilization of a particular instruction type in the pipeline. For example, a sparse AVX2 will fall in AVX2 Light license, while a dense AVX2 will fall in AVX2 Heavy license. PVC scheme of various embodiments uses heavy licenses. One example of the H licenses is illustrated by Table 2:

TABLE 4

| License number | License name |
|---|---|
| 0 | INT |
| 1 | 128 |
| 3 | 256 |
| 5 | 512 |
| 7 | TMUL |

At block 504, aCode releases the interrupt. This interrupt is the PVC throttled cycles interrupt. Here release means to reset the interrupt indication. This indicates aCode has responded to this interrupt and is ready to take the next interrupt if it comes. In one example, if a function is triggered by interrupt, hardware will not send new interrupt until aCode allows. New IO (input-output) bit will be set with interrupt by hardware and will be cleared by aCode when handling of interrupt done. When hardware triggers the interrupt to aCode, it blocks the throttling telemetry accumulator and lets aCode the time it needs for its calculation. This prevents a storm of interrupts to aCode during its calculation phase. When the aCode finishes the calculation, it releases the throttling telemetry block by a dedicated bit in the IO register.

At block 505, aCode decides whether license is granted. Granted license is the IccP license that power management hardware is currently using (e.g., currently used by a WP). If the license is granted, the process proceeds to block 506 where global IccP is triggered. Global IccP refers to the license aCode that is communicated to the power management unit of the SoC. Triggering global IccP means sending a new message to the power management unit of the SoC.

At block 507, aCode calculates average PVC throttling, IccP residency, and average Cdyn. PVC throttling average per cycle=(PVC throttling counter)/(C0 cycles). Both PVC throttling counter and C0 cycles (residency count in active C0 state) are telemetry inputs to the aCode (hardware accumulators). IccP residency is a hardware accumulator that counts how many cycles core was using each IccP license. Cdyn is calibrated per IccP license based upon post silicon measures (also an input to aCode).

At block 508, aCode determines whether average Cydn and average PVC throttling is less than a limit. Here, the limit is a throttling limit. For this example, the throttling limit less than 0.5% to move to aggressive threshold. But it can be any number depending on how sensitive the PVC algorithm is desired. If the average Cydn and the average PVC throttling is greater than the limit, the process ends. The process ends because the PVC scheme cannot go to a more aggressive level. Going to more aggressive level will increase throttling percentage resulting in lower performance. Instead, the PVC scheme keeps the aggressive level at the same level or at a threshold to less aggressive. Taking threshold to a lesser aggressive level is covered in the right half of the flow diagram (blocks 501-506). If the average Cydn and the average PVC throttling is less than the limit, the process proceeds to block 509.

At block 509, aCode updates the PVC threshold to a next threshold up (e.g., threshold is set to +1 of the previous threshold). In some embodiments, exponentially weighted moving average (EWMA) is computed for CdynMax with $\lambda=0.8$ (i.e., EWMA($C_{dyn\_digital}$)). $C_{dyn\_digital}$=(PVP average energy cost telemetry)/(Core_Active_Time_In_Core_clock_cycles)

if (hystresis>0&&

(currentThreshold==threshold$_{lowactivty}$))than no update requres else if (Th$_{avarage}$<0.005&&(2*(CdynDigital))<Target_threshold)than update requires While the embodiments use 0.0005, it can be any number (e.g., 0.5%, 5%, or more).

At block 510, aCode updates CdynMax and frequency index (TRL). For example, new parameters for more aggressive threshold are computed.

$$CurrentThreshold[iccp]=Threshold+1[iccp]$$

$$Cdyn\_max[iccp]= if\ (MT)Cdyn\_max[iccp][Current\text{-}Threshold]$$

$$else\ Cdyn\_max[iccp][CurrentThreshold]-Cdyn\_Max\_ST\_delta*Cdyn\_Max$$

When changing the threshold level, aCode uses a new CdynMax (that matches the new threshold). aCode distinguishes between MT (multithread) and ST (single thread) Cdyns. The difference between them is a constant delta. So, based on the core mode (ST/MT), aCode decides on the required Cdyn. In various embodiments, the first and second paths (e.g., blocks 501-506, and blocks 507-510) are repetitive. For example, CdynMax is calculated every 200 to 400 microseconds.

Elements of embodiments are also provided as a machine-readable medium (e.g., memory) for storing the computer-executable instructions (e.g., instructions to implement any other processes discussed herein). In some embodiments, a computing platform comprises a memory, a processor, a machine-readable storage media (also referred to as tangible machine readable medium), a communication interface (e.g., wireless or wired interface), and a network bus coupling them.

In some embodiments, the processor is a Digital Signal Processor (DSP), an Application Specific Integrated Circuit (ASIC), a general-purpose Central Processing Unit (CPU), or a low power logic implementing a simple finite state machine to perform the method of various embodiments, etc.

In some embodiments, the various logic blocks of the system are coupled together via the network bus. Any suitable protocol may be used to implement the network bus. In some embodiments, the machine-readable storage medium includes instructions (also referred to as the program software code/instructions) for intelligent prediction of processor idle time as described with reference to the various embodiments and flowchart.

Program software code/instructions associated with flowchart(s) (and/or various embodiments) and executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software" or firmware embedded in processor. In some embodiments, the program software code/instructions associated with flowchart 500 (and/or various embodiments) are executed by the computer system.

In some embodiments, the program software code/instructions associated with flowchart 500 (and/or various embodiments) are stored in a computer executable storage medium and executed by the processor. Here, computer executable storage medium is a tangible machine-readable medium that can be used to store program software code/instructions and data that, when executed by a computing device, causes one or more processors to perform a method (s) as may be recited in one or more accompanying claims directed to the disclosed subject matter.

The tangible machine-readable medium may include storage of the executable software program code/instructions and data in various tangible locations, including for example ROM, volatile RAM, non-volatile memory and/or cache and/or other tangible memory as referenced in the present application. Portions of this program software code/instructions and/or data may be stored in any one of these storage and memory devices. Further, the program software code/ instructions can be obtained from other storage, including, e.g., through centralized servers or peer to peer networks and the like, including the Internet. Different portions of the software program code/instructions and data can be obtained at different times and in different communication sessions or in the same communication session.

The software program code/instructions (associated with flowchart 500 and other embodiments) and data can be obtained in their entirety prior to the execution of a respective software program or application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a tangible machine readable medium in entirety at a particular instance of time.

Examples of tangible computer-readable media include but are not limited to recordable and non-recordable type media such as volatile and non-volatile memory devices, read only memory (ROM), random access memory (RAM), flash memory devices, magnetic random-access memory, ferroelectric memory, floppy and other removable disks, magnetic storage media, optical storage media (e.g., Compact Disk Read-Only Memory (CD ROMS), Digital Versatile Disks (DVDs), etc.), among others. The software program code/instructions may be temporarily stored in digital tangible communication links while implementing electrical, optical, acoustical or other forms of propagating signals, such as carrier waves, infrared signals, digital signals, etc. through such tangible communication links.

In general, the tangible machine readable medium includes any tangible mechanism that provides (i.e., stores and/or transmits in digital form, e.g., data packets) information in a form accessible by a machine (i.e., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Galaxy®, Blackberry® Droid®, or the like, or any other device including a computing device. In one embodiment, processor-based system is in a form of or included within a PDA (personal digital assistant), a cellular phone, a notebook computer, a tablet, a game console, a set top box, an embedded system, a TV (television), a personal desktop computer, etc. Alternatively, the traditional communication applications and subsidized application(s) may be used in some embodiments of the disclosed subject matter.

In some embodiments, a machine-readable storage media is provided having machine executable instructions stored thereon that when executed cause one or more processors to perform a method comprising: determining a license residency for a processor core, wherein the license residency provides an indication to a firmware executing on a power management unit on a type of instruction executing on the processor core; dynamically adjusting a maximum dynamic capacitance threshold for the processor core; and updating an operating frequency of the processor core according to the dynamically adjusted maximum dynamic capacitance threshold.

In some embodiments, the method comprises monitoring telemetry to determine the maximum dynamic capacitance threshold. In some embodiments, the telemetry includes a number of throttled cycles for the processor core and a cost of average cycle dynamic capacitance for the processor core. In some embodiments, the method comprises in response to determining that the number of throttling cycles increases for the processor core: increasing the maximum dynamic capacitance threshold for the processor core; and lowering the operating frequency of the processor core. In some embodiments, the method comprises in response to determining that the number of throttling cycles decreases for the processor core: decreasing the maximum dynamic capacitance threshold for the processor core; and increasing the operating frequency of the processor core. In some embodiments, the license residency is mapped to a particular maximum dynamic capacitance threshold, voltage, and/or frequency.

In some embodiments, the method comprises in response to determining that the cost of average cycle dynamic capacitance is below a threshold: lowering the maximum dynamic capacitance threshold for the processor core; and increasing the operating frequency of the processor core. In some embodiments, the method comprises in response to determining that the cost of average cycle dynamic capacitance is above a threshold: raising the maximum dynamic capacitance threshold for the processor core; and decreasing the operating frequency of the processor core.

Figure 6:
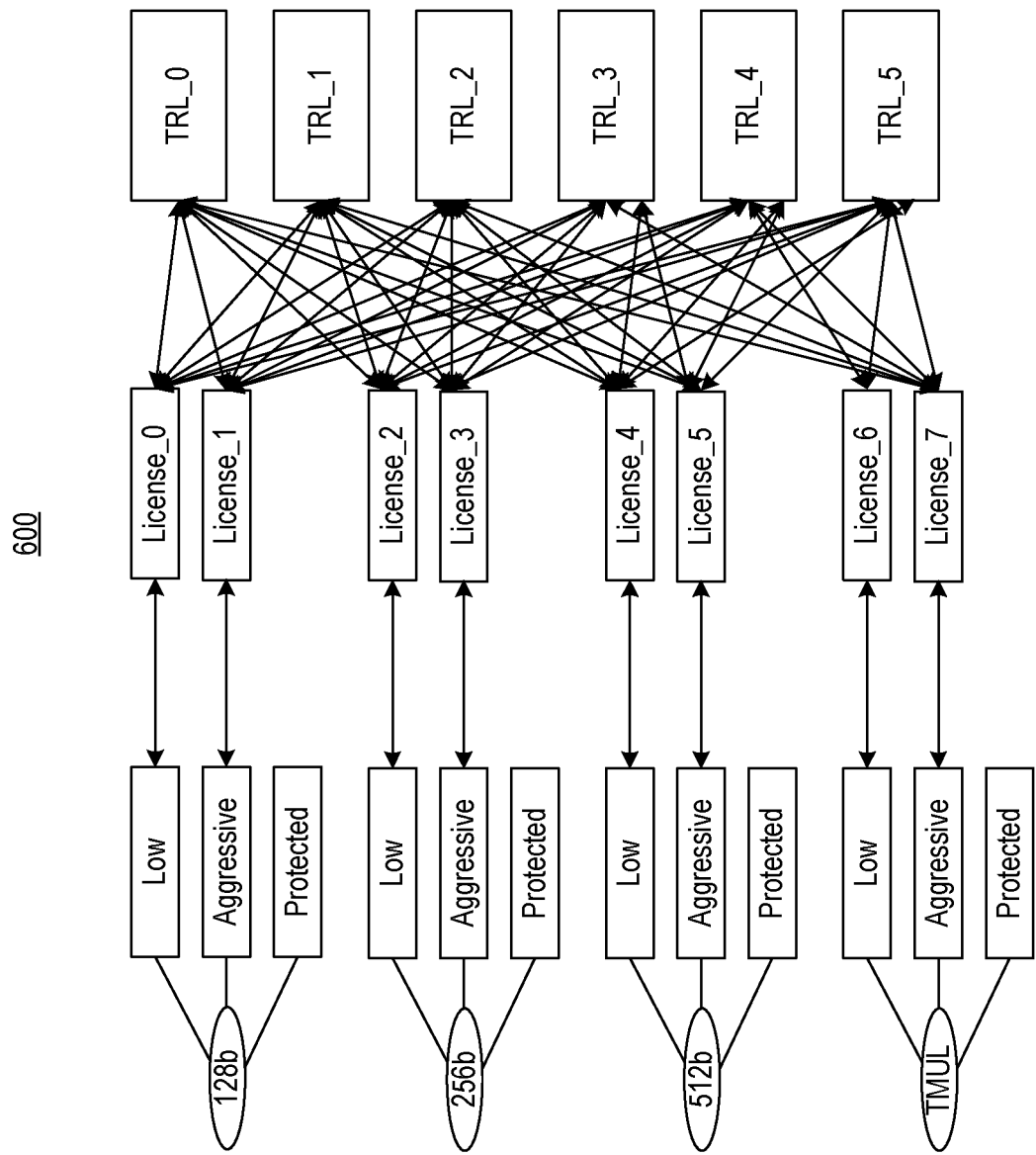
FIG. 6 illustrates dynamic mapping of CdynMax for Licenses, in accordance with some embodiments.

FIG. 6 illustrates dynamic mapping 600 of CdynMax for Licenses, in accordance with some embodiments. Each PVC threshold is mapped to a frequency (TRL). Although dynamic mapping 600 shows many-to-many possible mapping configuration, each PVC threshold for a license is mapped to a unique frequency. Higher (or highest) thresholds are mapped to lower (lowest) frequencies, and lower (lowest thresholds are mapped to higher (highest) frequencies. In generally, the more aggressive threshold refers to a lower PVC or CdynMax threshold, which is mapped to a higher frequency. Likewise, the less aggressive threshold or conservative threshold refers to a higher PVC or CdynMax threshold, which is mapped to a lower frequency.

Figure 7:
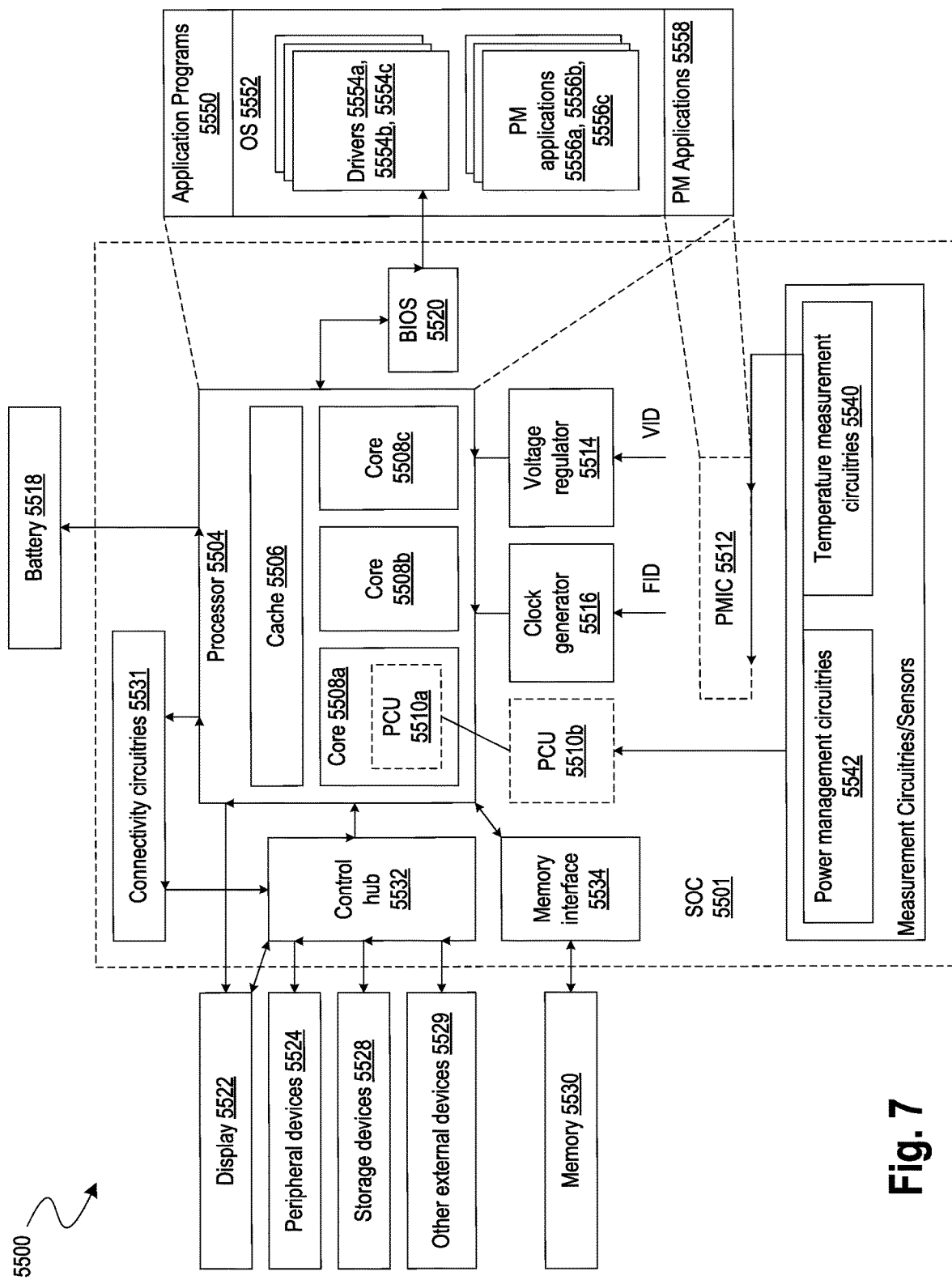
FIG. 7 illustrates a smart device or a computer system or a SoC (System-on-Chip) with the PVC scheme, in accordance with some embodiments.

FIG. 7 illustrates a smart device or a computer system or a SoC (System-on-Chip) with PVC scheme, in accordance with some embodiments. It is pointed out that those elements of FIG. 7 having the same reference numbers (or names) as the elements of any other figure may operate or function in any manner similar to that described, but are not limited to such. Any processing block here can implement the PVC scheme to dynamically adjust the CdynMax for that block, and hence the SoC.

In some embodiments, device 5500 represents an appropriate computing device, such as a computing tablet, a mobile phone or smart-phone, a laptop, a desktop, an Internet-of-Things (IoT) device, a server, a wearable device, a set-top box, a wireless-enabled e-reader, or the like. It will be understood that certain components are shown generally, and not all components of such a device are shown in device 5500.

In an example, the device 5500 comprises an SoC (System-on-Chip) 5501. An example boundary of the SoC 5501 is illustrated using dotted lines in FIG. 7, with some example components being illustrated to be included within SoC 5501—however, SoC 5501 may include any appropriate components of device 5500.

In some embodiments, device 5500 includes processor 5504. Processor 5504 can include one or more physical devices, such as microprocessors, application processors, microcontrollers, programmable logic devices, processing cores, or other processing implementations such as disaggregated combinations of multiple compute, graphics, accelerator, I/O and/or other processing chips. The processing operations performed by processor 5504 include the execution of an operating platform or operating system on which applications and/or device functions are executed. The processing operations include operations related to I/O (input/output) with a human user or with other devices, operations related to power management, operations related to connecting computing device 5500 to another device, and/or the like. The processing operations may also include operations related to audio I/O and/or display I/O.

In some embodiments, processor 5504 includes multiple processing cores (also referred to as cores) 5508a, 5508b, 5508c. Although merely three cores 5508a, 5508b, 5508c are illustrated in FIG. 7, processor 5504 may include any other appropriate number of processing cores, e.g., tens, or even hundreds of processing cores. Processor cores 5508a, 5508b, 5508c may be implemented on a single integrated circuit (IC) chip. Moreover, the chip may include one or more shared and/or private caches, buses or interconnections, graphics and/or memory controllers, or other components.

In some embodiments, processor 5504 includes cache 5506. In an example, sections of cache 5506 may be dedicated to individual cores 5508 (e.g., a first section of cache 5506 dedicated to core 5508a, a second section of cache 5506 dedicated to core 5508b, and so on). In an example, one or more sections of cache 5506 may be shared among two or more of cores 5508. Cache 5506 may be split in different levels, e.g., level 1 (L1) cache, level 2 (L2) cache, level 3 (L3) cache, etc.

In some embodiments, processor core 5504 may include a fetch unit to fetch instructions (including instructions with conditional branches) for execution by the core 5504. The instructions may be fetched from any storage devices such as the memory 5530. Processor core 5504 may also include a decode unit to decode the fetched instruction. For example, the decode unit may decode the fetched instruction into a plurality of micro-operations. Processor core 5504 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, execution unit may execute instructions out-of-order. Hence, processor core 5504 may be an out-of-order processor core in one embodiment. Processor core 5504 may also include a retirement unit. The retirement unit may retire executed instructions after they are committed. In an embodiment, retirement of the executed instructions may result in processor state being committed from the execution of the instructions, physical registers used by the instructions being de-allocated, etc. Processor core 5504 may also include a bus unit to enable communication between components of processor core 5504 and other components via one or more buses. Processor core 5504 may also include one or more registers to store data accessed by various components of the core 5504 (such as values related to assigned app priorities and/or sub-system states (modes) association.

In some embodiments, device 5500 comprises connectivity circuitries 5531. For example, connectivity circuitries 5531 includes hardware devices (e.g., wireless and/or wired connectors and communication hardware) and/or software components (e.g., drivers, protocol stacks), e.g., to enable device 5500 to communicate with external devices. Device 5500 may be separate from the external devices, such as other computing devices, wireless access points or base stations, etc.

In an example, connectivity circuitries 5531 may include multiple different types of connectivity. To generalize, the connectivity circuitries 5531 may include cellular connectivity circuitries, wireless connectivity circuitries, etc. Cellular connectivity circuitries of connectivity circuitries 5531 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 5531 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 5531 may include a network interface, such as a wired or wireless interface, e.g., so that a system embodiment may be incorporated into a wireless device, for example, a cell phone or personal digital assistant.

In some embodiments, device 5500 comprises control hub 5532, which represents hardware devices and/or software components related to interaction with one or more I/O devices. For example, processor 5504 may communicate with one or more of display 5522, one or more peripheral devices 5524, storage devices 5528, one or more other external devices 5529, etc., via control hub 5532. Control hub 5532 may be a chipset, a Platform Control Hub (PCH), and/or the like.

For example, control hub 5532 illustrates one or more connection points for additional devices that connect to device 5500, e.g., through which a user might interact with the system. For example, devices (e.g., devices 5529) that can be attached to device 5500 include microphone devices, speaker or stereo systems, audio devices, video systems or other display devices, keyboard or keypad devices, or other I/O devices for use with specific applications such as card readers or other devices.

As mentioned above, control hub 5532 can interact with audio devices, display 5522, etc. For example, input through a microphone or other audio device can provide input or commands for one or more applications or functions of device 5500. Additionally, audio output can be provided instead of, or in addition to display output. In another example, if display 5522 includes a touch screen, display 5522 also acts as an input device, which can be at least partially managed by control hub 5532. There can also be additional buttons or switches on computing device 5500 to provide I/O functions managed by control hub 5532. In one embodiment, control hub 5532 manages devices such as accelerometers, cameras, light sensors or other environmental sensors, or other hardware that can be included in device 5500. The input can be part of direct user interaction, as well as providing environmental input to the system to influence its operations (such as filtering for noise, adjusting displays for brightness detection, applying a flash for a camera, or other features).

In some embodiments, control hub 5532 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 5522 represents hardware (e.g., display devices) and software (e.g., drivers) components that provide a visual and/or tactile display for a user to interact with device 5500. Display 5522 may include a display interface, a display screen, and/or hardware device used to provide a display to a user. In some embodiments, display 5522 includes a touch screen (or touch pad) device that provides both output and input to a user. In an example, display 5522 may communicate directly with the processor 5504. Display 5522 can be one or more of an internal display device, as in a mobile electronic device or a laptop device or an external display device attached via a display interface (e.g., DisplayPort, etc.). In one embodiment display 5522 can be a head mounted display (HMD) such as a stereoscopic display device for use in virtual reality (VR) applications or augmented reality (AR) applications.

In some embodiments, and although not illustrated in the figure, in addition to (or instead of) processor 5504, device 5500 may include Graphics Processing Unit (GPU) comprising one or more graphics processing cores, which may control one or more aspects of displaying contents on display 5522.

Control hub 5532 (or platform controller hub) may include hardware interfaces and connectors, as well as software components (e.g., drivers, protocol stacks) to make peripheral connections, e.g., to peripheral devices 5524.

It will be understood that device 5500 could both be a peripheral device to other computing devices, as well as have peripheral devices connected to it. Device 5500 may have a "docking" connector to connect to other computing devices for purposes such as managing (e.g., downloading and/or uploading, changing, synchronizing) content on device 5500. Additionally, a docking connector can allow device 5500 to connect to certain peripherals that allow computing device 5500 to control content output, for example, to audiovisual or other systems.

In addition to a proprietary docking connector or other proprietary connection hardware, device 5500 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 5531 may be coupled to control hub 5532, e.g., in addition to, or instead of, being coupled directly to the processor 5504. In some embodiments, display 5522 may be coupled to control hub 5532, e.g., in addition to, or instead of, being coupled directly to processor 5504.

In some embodiments, device 5500 comprises memory 5530 coupled to processor 5504 via memory interface 5534. Memory 5530 includes memory devices for storing information in device 5500.

In some embodiments, memory 5530 includes apparatus to maintain stable clocking as described with reference to various embodiments. Memory can include nonvolatile (state does not change if power to the memory device is interrupted) and/or volatile (state is indeterminate if power to the memory device is interrupted) memory devices. Memory device 5530 can be a dynamic random-access memory (DRAM) device, a static random-access memory (SRAM) device, flash memory device, phase-change memory device, or some other memory device having suitable performance to serve as process memory. In one embodiment, memory 5530 can operate as system memory for device 5500, to store data and instructions for use when the one or more processors 5504 executes an application or process. Memory 5530 can store application data, user data, music, photos, documents, or other data, as well as system data (whether long-term or temporary) related to the execution of the applications and functions of device 5500.

Elements of various embodiments and examples are also provided as a machine-readable medium (e.g., memory 5530) for storing the computer-executable instructions (e.g., instructions to implement any other processes discussed herein). The machine-readable medium (e.g., memory 5530) may include, but is not limited to, flash memory, optical disks, CD-ROMs, DVD ROMs, RAMS, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 5500 comprises temperature measurement circuitries 5540, e.g., for measuring temperature of various components of device 5500. In an example, temperature measurement circuitries 5540 may be embedded, or coupled or attached to various components, whose temperature are to be measured and monitored. For example, temperature measurement circuitries 5540 may measure temperature of (or within) one or more of cores 5508a, 5508b, 5508c, voltage regulator 5514, memory 5530, a mother-board of SoC 5501, and/or any appropriate component of device 5500. In some embodiments, temperature measurement circuitries 5540 include a low power hybrid reverse (LPHR) bandgap reference (BGR) and digital temperature sensor (DTS), which utilizes subthreshold metal oxide semiconductor (MOS) transistor and the PNP parasitic Bi-polar Junction Transistor (BJT) device to form a reverse BGR that serves as the base for configurable BGR or DTS operating modes. The LPHR architecture uses low-cost MOS transistors and the standard parasitic PNP device. Based on a reverse bandgap voltage, the LPHR can work as a configurable BGR. By comparing the configurable BGR with the scaled base-emitter voltage, the circuit can also perform as a DTS with a linear transfer function with single-temperature trim for high accuracy.

In some embodiments, device 5500 comprises power measurement circuitries 5542, e.g., for measuring power consumed by one or more components of the device 5500. In an example, in addition to, or instead of, measuring power, the power measurement circuitries 5542 may measure voltage and/or current. In an example, the power measurement circuitries 5542 may be embedded, or coupled or attached to various components, whose power, voltage, and/or current consumption are to be measured and monitored. For example, power measurement circuitries 5542 may measure power, current and/or voltage supplied by one or more voltage regulators 5514, power supplied to SoC 5501, power supplied to device 5500, power consumed by processor 5504 (or any other component) of device 5500, etc.

In some embodiments, device 5500 comprises one or more voltage regulator circuitries, generally referred to as voltage regulator (VR) 5514. VR 5514 generates signals at appropriate voltage levels, which may be supplied to operate any appropriate components of the device 5500. Merely as an example, VR 5514 is illustrated to be supplying signals to processor 5504 of device 5500. In some embodiments, VR 5514 receives one or more Voltage Identification (VID) signals, and generates the voltage signal at an appropriate level, based on the VID signals. Various type of VRs may be utilized for the VR 5514. For example, VR 5514 may include a "buck" VR, "boost" VR, a combination of buck and boost VRs, low dropout (LDO) regulators, switching DC-DC regulators, constant-on-time controller-based DC-DC regulator, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR, which is controlled by PCU 5510a/b and/or PMIC 5512. In some embodiments, each core has a network of distributed LDOs to provide efficient control for power management. The LDOs can be digital, analog, or a combination of digital or analog LDOs. In some embodiments, VR 5514 includes current tracking apparatus to measure current through power supply rail(s).

In some embodiments, VR 5514 includes a digital control scheme to manage states of a proportional-integral-derivative (PID) filter (also known as a digital Type-III compensator). The digital control scheme controls the integrator of the PID filter to implement non-linear control of saturating the duty cycle during which the proportional and derivative terms of the PID are set to 0 while the integrator and its internal states (previous values or memory) is set to a duty cycle that is the sum of the current nominal duty cycle plus a deltaD. The deltaD is the maximum duty cycle increment that is used to regulate a voltage regulator from ICCmin to ICCmax and is a configuration register that can be set post silicon. A state machine moves from a non-linear all ON state (which brings the output voltage Vout back to a regulation window) to an open loop duty cycle which maintains the output voltage slightly higher than the required reference voltage Vref. After a certain period in this state of open loop at the commanded duty cycle, the state machine then ramps down the open loop duty cycle value until the output voltage is close to the Vref commanded. As such, output chatter on the output supply from VR 5514 is completely eliminated (or substantially eliminated) and there is merely a single undershoot transition which could lead to a guaranteed Vmin based on a comparator delay and the di/dt of the load with the available output decoupling capacitance.

In some embodiments, VR 5514 includes a separate self-start controller, which is functional without fuse and/or trim information. The self-start controller protects VR 5514 against large inrush currents and voltage overshoots, while being capable of following a variable VID (voltage identification) reference ramp imposed by the system. In some embodiments, the self-start controller uses a relaxation oscillator built into the controller to set the switching frequency of the buck converter. The oscillator can be initialized using either a clock or current reference to be close to a desired operating frequency. The output of VR 5514 is coupled weakly to the oscillator to set the duty cycle for closed loop operation. The controller is naturally biased such that the output voltage is always slightly higher than the set point, eliminating the need for any process, voltage, and/or temperature (PVT) imposed trims.

In some embodiments, device 5500 comprises one or more clock generator circuitries, generally referred to as clock generator 5516. Clock generator 5516 generates clock signals at appropriate frequency levels, which may be supplied to any appropriate components of device 5500. Merely as an example, clock generator 5516 is illustrated to be supplying clock signals to processor 5504 of device 5500. In some embodiments, clock generator 5516 receives one or more Frequency Identification (FID) signals, and generates the clock signals at an appropriate frequency, based on the FID signals.

In some embodiments, device 5500 comprises battery 5518 supplying power to various components of device 5500. Merely as an example, battery 5518 is illustrated to be supplying power to processor 5504. Although not illustrated in the figures, device 5500 may comprise a charging circuitry, e.g., to recharge the battery, based on Alternating Current (AC) power supply received from an AC adapter.

In some embodiments, battery 5518 periodically checks an actual battery capacity or energy with charge to a preset voltage (e.g., 4.1 V). The battery then decides of the battery capacity or energy. If the capacity or energy is insufficient, then an apparatus in or associated with the battery slightly increases charging voltage to a point where the capacity is sufficient (e.g. from 4.1 V to 4.11 V). The process of periodically checking and slightly increase charging voltage is performed until charging voltage reaches specification limit (e.g., 4.2 V). The scheme described herein has benefits such as battery longevity can be extended, risk of insufficient energy reserve can be reduced, burst power can be used as long as possible, and/or even higher burst power can be used.

In some embodiments, battery 5518 is a multi-battery system with workload dependent load-sharing mechanism. The mechanism is an energy management system that operates in three modes-energy saving mode, balancer mode, and turbo mode. The energy saving mode is a normal mode where the multiple batteries (collectively shown as battery 5518) provide power to their own set of loads with least resistive dissipation. In balancing mode, the batteries are connected through switches operating in active mode so that the current shared is inversely proportion to the corresponding battery state-of-charge. In turbo mode, both batteries are connected in parallel through switches (e.g., on-switches) to provide maximum power to a processor or load. In some embodiments, battery 5518 is a hybrid battery which comprising a fast charging battery and a high energy density battery. Fast charging battery (FC) means a battery capable of faster charging than high energy density battery (HE). FC may be today's Li-ion battery as it is capable of faster charging than HE. In some embodiments, a controller (part of battery 5518) optimizes the sequence and charging rate for the hybrid battery to maximize both the charging current and charging speed of the battery, while enabling longer battery life.

In some embodiments, the charging circuitry (e.g., 5518) comprises a buck-boost converter. This buck-boost converter comprises DrMOS or DrGaN devices used in place of half-bridges for traditional buck-boost converters. Various embodiments here are described with reference to DrMOS. However, the embodiments are applicable to DrGaN. The DrMOS devices allow for better efficiency in power conversion due to reduced parasitic and optimized MOSFET packaging. Since the dead-time management is internal to the DrMOS, the dead-time management is more accurate than for traditional buck-boost converters leading to higher efficiency in conversion. Higher frequency of operation allows for smaller inductor size, which in turn reduces the z-height of the charger comprising the DrMOS based buck-boost converter. The buck-boost converter of various embodiments comprises dual-folded bootstrap for DrMOS devices. In some embodiments, in addition to the traditional bootstrap capacitors, folded bootstrap capacitors are added that cross-couple inductor nodes to the two sets of DrMOS switches.

In some embodiments, device 5500 comprises Power Control Unit (PCU) 5510 (also referred to as Power Management Unit (PMU), Power Management Controller (PMC), Power Unit (p-unit), etc.). In an example, some sections of PCU 5510 may be implemented by one or more processing cores 5508, and these sections of PCU 5510 are symbolically illustrated using a dotted box and labelled PCU 5510a. In an example, some other sections of PCU 5510 may be implemented outside the processing cores 5508, and these sections of PCU 5510 are symbolically illustrated using a dotted box and labelled as PCU 5510b. PCU 5510 may implement various power management operations for device 5500. PCU 5510 may include hardware interfaces, hardware circuitries, connectors, registers, etc., as well as software components (e.g., drivers, protocol stacks), to implement various power management operations for device 5500.

In various embodiments, PCU or PMU 5510 is organized in a hierarchical manner forming a hierarchical power management (HPM). HPM of various embodiments builds a capability and infrastructure that allows for package level management for the platform, while still catering to islands of autonomy that might exist across the constituent die in the package. HPM does not assume a pre-determined mapping of physical partitions to domains. An HPM domain can be aligned with a function integrated inside a dielet, to a dielet boundary, to one or more dielets, to a companion die, or even a discrete CXL device. HPM addresses integration of multiple instances of the same die, mixed with proprietary functions or 3rd party functions integrated on the same die or separate die, and even accelerators connected via CXL (e.g., Flexbus) that may be inside the package, or in a discrete form factor.

HPM enables designers to meet the goals of scalability, modularity, and late binding. HPM also allows PMU functions that may already exist on other dice to be leveraged, instead of being disabled in the flat scheme. HPM enables management of any arbitrary collection of functions independent of their level of integration. HPM of various embodiments is scalable, modular, works with symmetric multi-chip processors (MCPs), and works with asymmetric MCPs. For example, HPM does not need a signal PM controller and package infrastructure to grow beyond reasonable scaling limits. HPM enables late addition of a die in a package without the need for change in the base die infrastructure. HPM addresses the need of disaggregated solutions having dies of different process technology nodes coupled in a single package. HPM also addresses the needs of companion die integration solutions-on and off package.

In various embodiments, each die (or dielet) includes a power management unit (PMU) or p-unit. For example, processor dies can have a supervisor p-unit, supervisee p-unit, or a dual role supervisor/supervisee p-unit. In some embodiments, an I/O die has its own dual role p-unit such as supervisor and/or supervisee p-unit. The p-units in each die can be instances of a generic p-unit. In one such example, all p-units have the same capability and circuits, but are configured (dynamically or statically) to take a role of a supervisor, supervisee, and/or both. In some embodiments, the p-units for compute dies are instances of a compute p-unit while p-units for IO dies are instances of an IO p-unit different from the compute p-unit. Depending on the role, p-unit acquires specific responsibilities to manage power of the multichip module and/or computing platform. While various p-units are described for dies in a multichip module or system-on-chip, a p-unit can also be part of an external device such as I/O device.

Here, the various p-units do not have to be the same. The HPM architecture can operate very different types of p-units. One common feature for the p-units is that they are expected to receive HPM messages and are expected to be able to comprehend them. In some embodiments, the p-unit of IO dies may be different than the p-unit of the compute dies. For example, the number of register instances of each class of register in the IO p-unit is different than those in the p-units of the compute dies. An IO die has the capability of being an HPM supervisor for CXL connected devices, but compute die may not need to have that capability. The IO and computes dice also have different firmware flows and possibly different firmware images. These are choices that an implementation can make. An HPM architecture can choose to have one superset firmware image and selectively execute flows that are relevant to the die type the firmware is associated with. Alternatively, there can be a customer firmware for each p-unit type; it can allow for more streamlined sizing of the firmware storage requirements for each p-unit type.

The p-unit in each die can be configured as a supervisor p-unit, supervisee p-unit or with a dual role of supervisor/supervisee. As such, p-units can perform roles of supervisor or supervisee for various domains. In various embodiments, each instance of p-unit is capable of autonomously managing local dedicated resources and contains structures to aggregate data and communicate between instances to enable shared resource management by the instance configured as the shared resource supervisor. A message and wire-based infrastructure is provided that can be duplicated and configured to facilitate management and flows between multiple p-units.

In some embodiments, power and thermal thresholds are communicated by a supervisor p-unit to supervisee p-units. For example, a supervisor p-unit learns of the workload (present and future) of each die, power measurements of each die, and other parameters (e.g., platform level power boundaries) and determines new power limits for each die. These power limits are then communicated by supervisor p-units to the supervisee p-units via one or more interconnects and fabrics. In some embodiments, a fabric indicates a group of fabrics and interconnect including a first fabric, a second fabric, and a fast response interconnect. In some embodiments, the first fabric is used for common communication between a supervisor p-unit and a supervisee p-unit. These common communications include change in voltage, frequency, and/or power state of a die which is planned based on a number of factors (e.g., future workload, user behavior, etc.). In some embodiments, the second fabric is used for higher priority communication between supervisor p-unit and supervisee p-unit. Example of higher priority communication include a message to throttle because of a possible thermal runaway condition, reliability issue, etc. In some embodiments, a fast response interconnect is used for communicating fast or hard throttle of all dies. In this case, a supervisor p-unit may send a fast throttle message to all other p-units, for example. In some embodiments, a fast response interconnect is a legacy interconnect whose function can be performed by the second fabric.

The HPM architecture of various embodiments enables scalability, modularity, and late binding of symmetric and/or asymmetric dies. Here, symmetric dies are dies of same size, type, and/or function, while asymmetric dies are dies of different size, type, and/or function. Hierarchical approach also allows PMU functions that may already exist on other dice to be leveraged, instead of being disabled in the traditional flat power management scheme. HPM does not assume a pre-determined mapping of physical partitions to domains. An HPM domain can be aligned with a function integrated inside a dielet, to a dielet boundary, to one or more dielets, to a companion die, or even a discrete CXL device. HPM enables management of any arbitrary collection of functions independent of their level of integration. In some embodiments, a p-unit is declared a supervisor p-unit based on one or more factors. These factors include memory size, physical constraints (e.g., number of pin-outs), and locations of sensors (e.g., temperature, power consumption, etc.) to determine physical limits of the processor.

The HPM architecture of various embodiments, provides a means to scale power management so that a single p-unit instance does not need to be aware of the entire processor. This enables power management at a smaller granularity and improves response times and effectiveness. Hierarchical structure maintains a monolithic view to the user. For example, at an operating system (OS) level, HPM architecture gives the OS a single PMU view even though the PMU is physically distributed in one or more supervisor-supervisee configurations.

In some embodiments, the HPM architecture is centralized where one supervisor controls all supervisees. In some embodiments, the HPM architecture is decentralized, wherein various p-units in various dies control overall power management by peer-to-peer communication. In some embodiments, the HPM architecture is distributed where there are different supervisors for different domains. One example of a distributed architecture is a tree-like architecture.

In some embodiments, device 5500 comprises Power Management Integrated Circuit (PMIC) 5512, e.g., to implement various power management operations for device 5500. In some embodiments, PMIC 5512 is a Reconfigurable Power Management ICs (RPMICs) and/or an IMVP (Intel® Mobile Voltage Positioning). In an example, the PMIC is within an IC die separate from processor 5504. The may implement various power management operations for device 5500. PMIC 5512 may include hardware interfaces, hardware circuitries, connectors, registers, etc., as well as software components (e.g., drivers, protocol stacks), to implement various power management operations for device 5500.

In an example, device 5500 comprises one or both PCU 5510 or PMIC 5512. In an example, any one of PCU 5510 or PMIC 5512 may be absent in device 5500, and hence, these components are illustrated using dotted lines.

Various power management operations of device 5500 may be performed by PCU 5510, by PMIC 5512, or by a combination of PCU 5510 and PMIC 5512. For example, PCU 5510 and/or PMIC 5512 may select a power state (e.g., P-state) for various components of device 5500. For example, PCU 5510 and/or PMIC 5512 may select a power state (e.g., in accordance with the ACPI (Advanced Configuration and Power Interface) specification) for various components of device 5500. Merely as an example, PCU 5510 and/or PMIC 5512 may cause various components of the device 5500 to transition to a sleep state, to an active state, to an appropriate C state (e.g., C0 state, or another appropriate C state, in accordance with the ACPI specification), etc. In an example, PCU 5510 and/or PMIC 5512 may control a voltage output by VR 5514 and/or a frequency of a clock signal output by the clock generator, e.g., by outputting the VID signal and/or the FID signal, respectively. In an example, PCU 5510 and/or PMIC 5512 may control battery power usage, charging of battery 5518, and features related to power saving operation.

The clock generator 5516 can comprise a phase locked loop (PLL), frequency locked loop (FLL), or any suitable clock source. In some embodiments, each core of processor 5504 has its own clock source. As such, each core can operate at a frequency independent of the frequency of operation of the other core. In some embodiments, PCU 5510 and/or PMIC 5512 performs adaptive or dynamic frequency scaling or adjustment. For example, clock frequency of a processor core can be increased if the core is not operating at its maximum power consumption threshold or limit. In some embodiments, PCU 5510 and/or PMIC 5512 determines the operating condition of each core of a processor, and opportunistically adjusts frequency and/or power supply voltage of that core without the core clocking source (e.g., PLL of that core) losing lock when the PCU 5510 and/or PMIC 5512 determines that the core is operating below a target performance level. For example, if a core is drawing current from a power supply rail less than a total current allocated for that core or processor 5504, then PCU 5510 and/or PMIC 5512 can temporality increase the power draw for that core or processor 5504 (e.g., by increasing clock frequency and/or power supply voltage level) so that the core or processor 5504 can perform at higher performance level. As such, voltage and/or frequency can be increased temporality for processor 5504 without violating product reliability.

In an example, PCU 5510 and/or PMIC 5512 may perform power management operations, e.g., based at least in part on receiving measurements from power measurement circuitries 5542, temperature measurement circuitries 5540, charge level of battery 5518, and/or any other appropriate information that may be used for power management. To that end, PMIC 5512 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 5510 and/or PMIC 5512 in at least one embodiment to allow PCU 5510 and/or PMIC 5512 to manage processor core energy at least in part based on value(s) detected by one or more of the sensors.

Also illustrated is an example software stack of device 5500 (although not all elements of the software stack are illustrated). Merely as an example, processors 5504 may execute application programs 5550, Operating System 5552, one or more Power Management (PM) specific application programs (e.g., generically referred to as PM applications 5558), and/or the like. PM applications 5558 may also be executed by the PCU 5510 and/or PMIC 5512. OS 5552 may also include one or more PM applications 5556a, 5556b, 5556c. The OS 5552 may also include various drivers 5554a, 5554b, 5554c, etc., some of which may be specific for power management purposes. In some embodiments, device 5500 may further comprise a Basic Input/output System (BIOS) 5520. BIOS 5520 may communicate with OS 5552 (e.g., via one or more drivers 5554), communicate with processors 5504, etc.

For example, one or more of PM applications 5558, 5556, drivers 5554, BIOS 5520, etc. may be used to implement power management specific tasks, e.g., to control voltage and/or frequency of various components of device 5500, to control wake-up state, sleep state, and/or any other appropriate power state of various components of device 5500, control battery power usage, charging of the battery 5518, features related to power saving operation, etc.

In some embodiments, battery 5518 is a Li-metal battery with a pressure chamber to allow uniform pressure on a battery. The pressure chamber is supported by metal plates (such as pressure equalization plate) used to give uniform pressure to the battery. The pressure chamber may include pressured gas, elastic material, spring plate, etc. The outer skin of the pressure chamber is free to bow, restrained at its edges by (metal) skin, but still exerts a uniform pressure on the plate that is compressing the battery cell. The pressure chamber gives uniform pressure to battery, which is used to enable high-energy density battery with, for example, 20% more battery life.

In some embodiments, battery 5518 includes hybrid technologies. For example, a mix of high energy density charge (e.g., Li-ion batteries) carrying device(s) and low energy density charge carrying devices (e.g., supercapacitor) are used as batteries or storage devices. In some embodiments, a controller (e.g., hardware, software, or a combination of them) is used analyze peak power patterns and minimizes the impact to overall lifespan of high energy density charge carrying device-based battery cells while maximizing service time for peak power shaving feature. The controller may be part of battery 5518 or part of p-unit 5510b.

In some embodiments, pCode executing on PCU 5510*a/b* has a capability to enable extra compute and telemetries resources for the runtime support of the pCode. Here pCode refers to a firmware executed by PCU 5510*a/b* to manage performance of the SoC 5501. For example, pCode may set frequencies and appropriate voltages for the processor. Part of the pCode are accessible via OS 5552. In various embodiments, mechanisms and methods are provided that dynamically change an Energy Performance Preference (EPP) value based on workloads, user behavior, and/or system conditions. There may be a well-defined interface between OS 5552 and the pCode. The interface may allow or facilitate the software configuration of several parameters and/or may provide hints to the pCode. As an example, an EPP parameter may inform a pCode algorithm as to whether performance or battery life is more important.

This support may be done as well by the OS 5552 by including machine-learning support as part of OS 5552 and either tuning the EPP value that the OS hints to the hardware (e.g., various components of SoC 5501) by machine-learning prediction, or by delivering the machine-learning prediction to the pCode in a manner similar to that done by a Dynamic Tuning Technology (DTT) driver. In this model, OS 5552 may have visibility to the same set of telemetries as are available to a DTT. As a result of a DTT machine-learning hint setting, pCode may tune its internal algorithms to achieve optimal power and performance results following the machine-learning prediction of activation type. The pCode as example may increase the responsibility for the processor utilization change to enable fast response for user activity, or may increase the bias for energy saving either by reducing the responsibility for the processor utilization or by saving more power and increasing the performance lost by tuning the energy saving optimization. This approach may facilitate saving more battery life in case the types of activities enabled lose some performance level over what the system can enable. The pCode may include an algorithm for dynamic EPP that may take the two inputs, one from OS 5552 and the other from software such as DTT, and may selectively choose to provide higher performance and/or responsiveness. As part of this method, the pCode may enable in the DTT an option to tune its reaction for the DTT for different types of activity.

In some embodiments, pCode improves the performance of the SoC in battery mode. In some embodiments, pCode allows drastically higher SoC peak power limit levels (and thus higher Turbo performance) in battery mode. In some embodiments, pCode implements power throttling and is part of Intel's Dynamic Tuning Technology (DTT). In various embodiments, the peak power limit is referred to as PL4. However, the embodiments are applicable to other peak power limits. In some embodiments, pCode sets the Vth threshold voltage (the voltage level at which the platform will throttle the SoC) in such a way as to prevent the system from unexpected shutdown (or black screening). In some embodiments, pCode calculates the Psoc,pk SoC Peak Power Limit (e.g., PL4), according to the threshold voltage (Vth). These are two dependent parameters, if one is set, the other can be calculated. pCode is used to optimally set one parameter (Vth) based on the system parameters, and the history of the operation. In some embodiments, pCode provides a scheme to dynamically calculate the throttling level (Psoc,th) based on the available battery power (which changes slowly) and set the SoC throttling peak power (Psoc,th). In some embodiments, pCode decides the frequencies and voltages based on Psoc,th. In this case, throttling events have less negative effect on the SoC performance. Various embodiments provide a scheme which allows maximum performance (Pmax) framework to operate.

In some embodiments, VR 5514 includes a current sensor to sense and/or measure current through a high-side switch of VR 5514. In some embodiments the current sensor uses an amplifier with capacitively coupled inputs in feedback to sense the input offset of the amplifier, which can be compensated for during measurement. In some embodiments, the amplifier with capacitively coupled inputs in feedback is used to operate the amplifier in a region where the input common-mode specifications are relaxed, so that the feedback loop gain and/or bandwidth is higher. In some embodiments, the amplifier with capacitively coupled inputs in feedback is used to operate the sensor from the converter input voltage by employing high-PSRR (power supply rejection ratio) regulators to create a local, clean supply voltage, causing less disruption to the power grid in the switch area. In some embodiments, a variant of the design can be used to sample the difference between the input voltage and the controller supply, and recreate that between the drain voltages of the power and replica switches. This allows the sensor to not be exposed to the power supply voltage. In some embodiments, the amplifier with capacitively coupled inputs in feedback is used to compensate for power delivery network related (PDN-related) changes in the input voltage during current sensing.

Some embodiments use three components to adjust the peak power of SoC 5501 based on the states of a USB TYPE-C device 5529. These components include OS Peak Power Manager (part of OS 5552), USB TYPE-C Connector Manager (part of OS 5552), and USB TYPE-C Protocol Device Driver (e.g., one of drivers 5554*a*, 5554*b*, 5554*c*). In some embodiments, the USB TYPE-C Connector Manager sends a synchronous request to the OS Peak Power Manager when a USB TYPE-C power sink device is attached or detached from SoC 5501, and the USB TYPE-C Protocol Device Driver sends a synchronous request to the Peak Power Manager when the power sink transitions device state. In some embodiments, the Peak Power Manager takes power budget from the CPU when the USB TYPE-C connector is attached to a power sink and is active (e.g., high power device state). In some embodiments, the Peak Power Manager gives back the power budget to the CPU for performance when the USB TYPE-C connector is either detached or the attached and power sink device is idle (lowest device state).

In some embodiments, logic is provided to dynamically pick the best operating processing core for BIOS power-up flows and sleep exit flows (e.g., S3, S4, and/or S5). The selection of the bootstrap processor (BSP) is moved to an early power-up time instead of a fixed hardware selection at any time. For maximum boot performance, the logic selects the fastest capable core as the BSP at an early power-up time. In addition, for maximum power saving, the logic selects the most power efficient core as the BSP. Processor or switching for selecting the BSP happens during the boot-up as well as power-up flows (e.g., S3, S4, and/or S5 flows).

In some embodiments, the memories herein are organized in multi-level memory architecture and their performance is governed by a decentralized scheme. The decentralized scheme includes p-unit 5510 and memory controllers. In some embodiments, the scheme dynamically balances a number of parameters such as power, thermals, cost, latency and performance for memory levels that are progressively further away from the processor in platform 5500 based on how applications are using memory levels that are further away from processor cores. In some examples, the decision making for the state of the far memory (FM) is decentralized. For example, a processor power management unit (p-unit), near memory controller (NMC), and/or far memory host controller (FMHC) makes decisions about the power and/or performance state of the FM at their respective levels. These decisions are coordinated to provide the most optimum power and/or performance state of the FM for a given time. The power and/or performance state of the memories adaptively change to changing workloads and other parameters even when the processor(s) is in a particular power state.

In some embodiments, a hardware and software coordinated processor power state policy (e.g., policy for C-state) is implemented that delivers optimal power state selection by taking in to account the performance and/or responsiveness needs of thread expected to be scheduled on the core entering idle, to achieve improved instructions per cycle (IPC) and performance for cores running user critical tasks. The scheme provides the ability to deliver responsiveness gains for important and/or user-critical threads running on a system-on-chip. P-unit 5510 which coupled to the plurality of processing cores, receives a hint from operating system 5552 indicative of a bias towards a power state or performance state for at least one of the processing cores of the plurality of processing cores based on a priority of a thread in context switch.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e.g., immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The term "analog signal" is any continuous signal for which the time varying feature (variable) of the signal is a representation of some other time varying quantity, i.e., analogous to another time varying signal.

The term "digital signal" is a physical signal that is a representation of a sequence of discrete values (a quantified discrete-time signal), for example of an arbitrary bit stream, or of a digitized (sampled and analog-to-digital converted) analog signal.

The term "scaling" generally refers to converting a design (schematic and layout) from one process technology to another process technology and may be subsequently being reduced in layout area. In some cases, scaling also refers to upsizing a design from one process technology to another process technology and may be subsequently increasing layout area. The term "scaling" generally also refers to downsizing or upsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described but are not limited to such.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors (BJT PNP/NPN), BiCMOS, CMOS, etc., may be used without departing from the scope of the disclosure.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

Various embodiments are described as examples. The examples can be combined in any suitable manner. For instance, example 5 can be combined with example 3 and/or example 7.

Example 1: An apparatus comprising: a processor core; and a power management unit coupled to the processor core, wherein the power management unit executes firmware to dynamically adjust maximum dynamic capacitance threshold and corresponding frequency for the processor core per application executed on the processor core.

Example 2: The apparatus of example 1, wherein the power management unit monitors telemetry to determine the maximum dynamic capacitance threshold.

Example 3: The apparatus of example 2, wherein the telemetry includes a number of throttled cycles for the processor core and a cost of average cycle dynamic capacitance for the processor core.

Example 4: The apparatus of example 3, wherein when the power management unit determines that the number of throttling cycles increases for the processor core, the firmware is to increase the maximum dynamic capacitance threshold for the processor core, and the power management unit lowers the corresponding frequency of the processor core.

Example 5: The apparatus of example 3, wherein when the power management unit determines that the number of throttling cycles decreases for the processor core, the firmware is to decrease the maximum dynamic capacitance threshold for the processor core, and the power management unit increases the corresponding frequency of the processor core.

Example 6: The apparatus of example 2, wherein the processor core includes a counter to count a number of throttled cycles for the processor core.

Example 7: The apparatus of example 3, wherein when the power management unit determines that the cost of average cycle dynamic capacitance is below a threshold, the firmware lowers the maximum dynamic capacitance threshold for the processor core, and the power management unit increases the corresponding frequency of the processor core.

Example 8: The apparatus of example 3, wherein when the power management unit determines that the cost of average cycle dynamic capacitance is above a threshold, the firmware raises the maximum dynamic capacitance threshold for the processor core, and the power management unit decreases the corresponding frequency of the processor core.

Example 9: The apparatus of example 1, wherein the firmware communicates with an operating system.

Example 10: A machine-readable storage media having machine executable instructions stored thereon that when executed cause one or more processors to perform a method comprising: determining a license residency for a processor core, wherein the license residency provides an indication to a firmware executing on a power management unit on a type of instruction executing on the processor core; dynamically adjusting a maximum dynamic capacitance threshold for the processor core; and updating an operating frequency of the processor core according to the dynamically adjusted maximum dynamic capacitance threshold.

Example 11: The machine-readable storage media of example 10 having machine executable instructions stored thereon that when executed cause the one or more processors to perform further a method comprising: monitoring telemetry to determine the maximum dynamic capacitance threshold.

Example 12: The machine-readable storage media of example 11, wherein the telemetry includes a number of throttled cycles for the processor core and a cost of average cycle dynamic capacitance for the processor core.

Example 13: The machine-readable storage media of example 12 having machine executable instructions stored thereon that when executed cause the one or more processors to perform further a method comprising: in response to determining that the number of throttling cycles increases for the processor core: increasing the maximum dynamic capacitance threshold for the processor core; and lowering the operating frequency of the processor core.

Example 14: The machine-readable storage media of example 12 having machine executable instructions stored thereon that when executed cause the one or more processors to perform further a method comprising: in response to determining that the number of throttling cycles decreases for the processor core: decreasing the maximum dynamic capacitance threshold for the processor core; and increasing the operating frequency of the processor core.

Example 15: The machine-readable storage media of example 10, wherein the license residency is mapped to a particular maximum dynamic capacitance threshold, voltage, and/or frequency.

Example 16: The machine-readable storage media of example 12 having machine executable instructions stored thereon that when executed cause the one or more processors to perform further a method comprising: in response to determining that the cost of average cycle dynamic capacitance is below a threshold: lowering the maximum dynamic capacitance threshold for the processor core; and increasing the operating frequency of the processor core.

Example 17: The machine-readable storage media of example 12 having machine executable instructions stored thereon that when executed cause the one or more processors to perform further a method comprising: in response to determining that the cost of average cycle dynamic capacitance is above a threshold: raising the maximum dynamic capacitance threshold for the processor core; and decreasing the operating frequency of the processor core.

Example 18: A system comprising: a memory; a processor coupled to the memory, the processor having a plurality of processor cores; and a wireless interface communicatively coupled to the processor, wherein the processor comprises: a power management unit coupled to a processor core of the plurality of processor cores, wherein the power management unit executes firmware to dynamically adjust maximum dynamic capacitance threshold and corresponding frequency for the processor core per application executed on the processor core.

Example 19: The system of example 18, wherein the power management unit monitors telemetry to determine the maximum dynamic capacitance threshold, wherein the telemetry includes a number of throttled cycles for the processor core and a cost of average cycle dynamic capacitance for the processor core.

Example 20: The system of example 19, wherein: when the power management unit determines that the number of throttling cycles increases for the processor core, the firmware is to increase the maximum dynamic capacitance threshold for the processor core, and the power management unit lowers the corresponding frequency of the processor core; and when the power management unit determines that the number of throttling cycles decreases for the processor core, the firmware is to decrease the maximum dynamic capacitance threshold for the processor core, and the power management unit increases the corresponding frequency of the processor core.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An apparatus comprising:
   a processor core; and
   a power management unit coupled to the processor core, wherein the power management unit executes firmware to dynamically adjust maximum dynamic capacitance threshold and corresponding frequency for the processor core per application executed on the processor core.

2. The apparatus of claim 1, wherein the power management unit monitors telemetry to determine the maximum dynamic capacitance threshold.

3. The apparatus of claim 2, wherein the telemetry includes a number of throttled cycles for the processor core and a cost of average cycle dynamic capacitance for the processor core.

4. The apparatus of claim 3, wherein when the power management unit determines that the number of throttled cycles increases for the processor core, the firmware is to increase the maximum dynamic capacitance threshold for the processor core, and the power management unit lowers the corresponding frequency of the processor core.

5. The apparatus of claim 3, wherein when the power management unit determines that the number of throttled cycles decreases for the processor core, the firmware is to decrease the maximum dynamic capacitance threshold for the processor core, and the power management unit increases the corresponding frequency of the processor core.

6. The apparatus of claim 3, wherein when the power management unit determines that the cost of average cycle dynamic capacitance is below a threshold, the firmware lowers the maximum dynamic capacitance threshold for the processor core, and the power management unit increases the corresponding frequency of the processor core.

7. The apparatus of claim 3, wherein when the power management unit determines that the cost of average cycle dynamic capacitance is above a threshold, the firmware raises the maximum dynamic capacitance threshold for the processor core, and the power management unit decreases the corresponding frequency of the processor core.

8. The apparatus of claim 2, wherein the processor core includes a counter to count a number of throttled cycles for the processor core.

9. The apparatus of claim 1, wherein the firmware communicates with an operating system.

10. A non-transitory machine-readable storage media having machine executable instructions stored thereon that when executed cause one or more processors to perform a method comprising:
    determining a license residency for a processor core, wherein the license residency provides an indication to a firmware executing on a power management unit on a type of instruction executing on the processor core;
    dynamically adjusting a maximum dynamic capacitance threshold for the processor core; and
    updating an operating frequency of the processor core according to the dynamically adjusted maximum dynamic capacitance threshold.

11. The non-transitory machine-readable storage media of claim 10 having machine executable instructions stored thereon that when executed cause the one or more processors to perform further a method comprising:
    monitoring telemetry to determine the maximum dynamic capacitance threshold.

12. The non-transitory machine-readable storage media of claim 11, wherein the telemetry includes a number of throttled cycles for the processor core and a cost of average cycle dynamic capacitance for the processor core.

13. The non-transitory machine-readable storage media of claim 12 having machine executable instructions stored thereon that when executed cause the one or more processors to perform further a method comprising:
    in response to determining that the number of throttled cycles increases for the processor core:
    increasing the maximum dynamic capacitance threshold for the processor core; and
    lowering the operating frequency of the processor core.

14. The non-transitory machine-readable storage media of claim 12 having machine executable instructions stored thereon that when executed cause the one or more processors to perform further a method comprising:
    in response to determining that the number of throttled cycles decreases for the processor core:
    decreasing the maximum dynamic capacitance threshold for the processor core; and
    increasing the operating frequency of the processor core.

15. The non-transitory machine-readable storage media of claim 12 having machine executable instructions stored thereon that when executed cause the one or more processors to perform further a method comprising:
    in response to determining that the cost of average cycle dynamic capacitance is below a threshold:
    lowering the maximum dynamic capacitance threshold for the processor core; and
    increasing the operating frequency of the processor core.

16. The non-transitory machine-readable storage media of claim 12 having machine executable instructions stored thereon that when executed cause the one or more processors to perform further a method comprising:
    in response to determining that the cost of average cycle dynamic capacitance is above a threshold:
    raising the maximum dynamic capacitance threshold for the processor core; and decreasing the operating frequency of the processor core.

17. The non-transitory machine-readable storage media of claim 10, wherein the license residency is mapped to a particular maximum dynamic capacitance threshold, voltage, or frequency.

18. A system comprising:
a memory;
a processor coupled to the memory, the processor having a plurality of processor cores; and
a wireless interface communicatively coupled to the processor, wherein the processor comprises:
a power management unit coupled to a processor core of the plurality of processor cores, wherein the power management unit executes firmware to dynamically adjust maximum dynamic capacitance threshold and corresponding frequency for the processor core per application executed on the processor core.

19. The system of claim 18, wherein the power management unit monitors telemetry to determine the maximum dynamic capacitance threshold, wherein the telemetry includes a number of throttled cycles for the processor core and a cost of average cycle dynamic capacitance for the processor core.

20. The system of claim 19, wherein:
when the power management unit determines that the number of throttled cycles increases for the processor core, the firmware is to increase the maximum dynamic capacitance threshold for the processor core, and the power management unit lowers the corresponding frequency of the processor core; and
when the power management unit determines that the number of throttled cycles decreases for the processor core, the firmware is to decrease the maximum dynamic capacitance threshold for the processor core, and the power management unit increases the corresponding frequency of the processor core.

* * * * *